(12) United States Patent
Back et al.

(10) Patent No.: US 12,167,493 B2
(45) Date of Patent: Dec. 10, 2024

(54) SIDELINK DRX-ASSOCIATED OPERATION METHOD FOR UE IN WIRELESS COMMUNICATION SYSTEM

(71) Applicant: LG Electronics Inc., Seoul (KR)

(72) Inventors: Seoyoung Back, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 386 days.

(21) Appl. No.: 17/776,019

(22) PCT Filed: Nov. 12, 2020

(86) PCT No.: PCT/KR2020/015876
§ 371 (c)(1),
(2) Date: May 11, 2022

(87) PCT Pub. No.: WO2021/096244
PCT Pub. Date: May 20, 2021

(65) Prior Publication Data
US 2022/0418036 A1 Dec. 29, 2022

(30) Foreign Application Priority Data

Nov. 12, 2019 (KR) .................. 10-2019-0144429
Nov. 27, 2019 (KR) .................. 10-2019-0153931

(51) Int. Cl.
*H04W 76/28* (2018.01)
(52) U.S. Cl.
CPC .................. *H04W 76/28* (2018.02)

(58) Field of Classification Search
CPC . H04W 76/28; H04W 52/0216; H04W 76/14; H04W 92/18
See application file for complete search history.

(56) References Cited

U.S. PATENT DOCUMENTS

2019/0254110 A1   8/2019   He et al.
2019/0261287 A1*  8/2019   Deenoo ............. H04W 52/0216

FOREIGN PATENT DOCUMENTS

WO    2018084796 A1      5/2018
WO    WO-2019101146 A1 *  5/2019 ........... H04L 1/1812

OTHER PUBLICATIONS

Huawei, HiSilicon, "PDCCH-based power saving signal/channel", 3GPP TSG RAN WG1 Meeting #99, Nov. 18-22, 2019, R1-1912915.

* cited by examiner

*Primary Examiner* — Ayanah S George
(74) *Attorney, Agent, or Firm* — BRYAN CAVE LEIGHTON PAISNER LLP

(57) ABSTRACT

An embodiment is a sidelink-associated operation method for a transmission user equipment (UE) in a wireless communication system, the method comprising the steps of: determining a long DRX cycle and a short DRX cycle; and on the basis of the long DRX cycle, the short DRX cycle, and a first offset, monitoring control information in an on-duration, wherein the first offset is determined as a sum of k times (wherein k is an integer) a value associated with a sidelink service and a second offset associated with the sidelink service, and the long DRX cycle and the short DRX cycle are determined as m times and n times (wherein m and n are integers) the value associated with the sidelink service, respectively.

13 Claims, 27 Drawing Sheets

(a)

(b)

(a)

(b)

SIDELINK DRX-ASSOCIATED OPERATION METHOD FOR UE IN WIRELESS COMMUNICATION SYSTEM

This application is the National Stage filing under 35 U.S.C. 371 of International Application No. PCT/KR2020/015876 filed on Nov. 12, 2020, which claims priority to Korean Patent Application Nos. 10-2019-0144429 filed on Nov. 12, 2019 and 10-2019-0153931 filed on Nov. 27, 2019, the contents of which are all hereby incorporated by reference herein in their entirety.

TECHNICAL FIELD

The following description relates to a wireless communication system, and more particularly to an operating method and apparatus of a UE related to sidelink discontinuous reception (DRX).

BACKGROUND ART

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object to be achieved with embodiment(s) is to provide a method of limiting a DRX pattern by limiting a DRX pattern configuration for each service, a randomization method, and operation methods for an ON state at the same time irrespective of a DRX pattern.

Technical Solution

According to an embodiment, a sidelink related operation method of a transmission user equipment (UE) in a wireless communication system may include determining a Long DRX cycle and a Short DRX cycle, and monitoring control information in an on duration based on the Long DRX cycle, the Short DRX cycle, and the first offset, wherein the first offset is determined as a sum of k times (k being an integer) a value related to a sidelink service and a second offset related to the sidelink service, and the Long DRX cycle and the Short DRX cycle are determined as m times and n times (m and n being an integer) the value related to the sidelink service, respectively.

According to an embodiment, a user equipment (UE) in a wireless communication system may include at least one processor, and at least one computer memory operatively connected to the at least one processor and configured to store commands that when executed causes the at least one processor to perform operations, wherein the operations may include determining a Long DRX cycle and a Short DRX cycle; and monitoring control information in an on duration based on the Long DRX cycle, the Short DRX cycle, and the first offset, wherein the first offset is determined as a sum of k times (k being an integer) a value related to a sidelink service and a second offset related to the sidelink service, and the Long DRX cycle and the Short DRX cycle are determined as m times and n times (m and n being an integer) the value related to the sidelink service, respectively.

According to an embodiment, a processor for performing operations for a user equipment (UE) in a wireless communication system may be provided, the operations including determining a Long DRX cycle and a Short DRX cycle, and monitoring control information in an on duration based on the Long DRX cycle, the Short DRX cycle, and the first offset, wherein the first offset is determined as a sum of k times (k being an integer) a value related to a sidelink service and a second offset related to the sidelink service, and the Long DRX cycle and the Short DRX cycle are determined as m times and n times (m and n being an integer) the value related to the sidelink service, respectively.

According to an embodiment, a non-volatile computer-readable storage medium for storing at least one computer program including at least one command for causing at least one processor to perform operations for a user equipment (UE) when being executed by the at least one processor may be provided, the operations including determining a Long DRX cycle and a Short DRX cycle, and monitoring control information in an on duration based on the Long DRX cycle, the Short DRX cycle, and the first offset, wherein the first offset is determined as a sum of k times (k being an integer) a value related to a sidelink service and a second offset related to the sidelink service, and the Long DRX cycle and the Short DRX cycle are determined as m times and n times (m and n being an integer) the value related to the sidelink service, respectively.

The value related to the sidelink service and the second offset may be differently configured for respective sidelink services.

The value related to the sidelink service and the second offset may be configured to the same value irrespective of the sidelink service.

A range of values to be selected as m and n may be configured for each sidelink service.

Ranges of the values to be selected as m and n may at least partially overlap each other.

The value related to the sidelink service may be determined based on a minimum delay related to a specific service.

The related to the sidelink service may be determined in a MAC layer based on a service ID.

The related to the sidelink service may be received via RRC signaling.

The same value may be used irrespective of the sidelink service for only the second offset among the value related to the sidelink service and the second offset.

The UE may communicate with at least one of another UE, a UE related to autonomous driving vehicle, a base station (BS), or a network.

Advantageous Effects

According to an embodiment, DRX UEs using the same service may detect with each other using only a low-power operation and UEs using the same service within the same time range as possible may wake up by aligning DRX patterns for each service ID, thereby increasing frequency use efficiency.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

In various embodiments of the present disclosure, "I" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
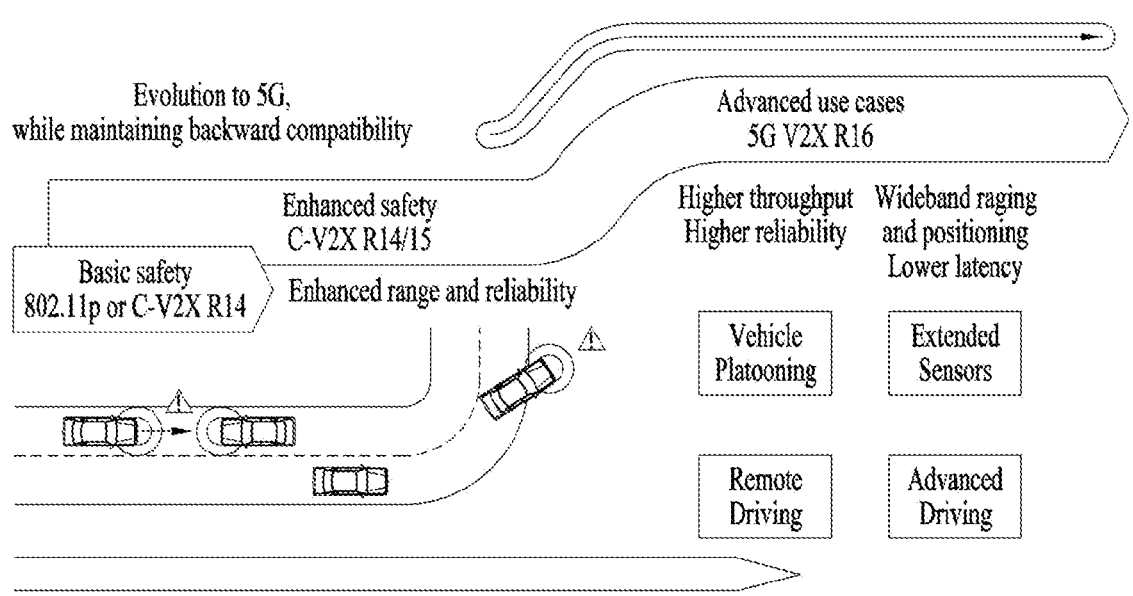
FIG. 1 is a diagram comparing vehicle-to-everything (V2X) communication based on pre-new radio access technology (pre-NR) with V2X communication based on NR.
Figure 2:
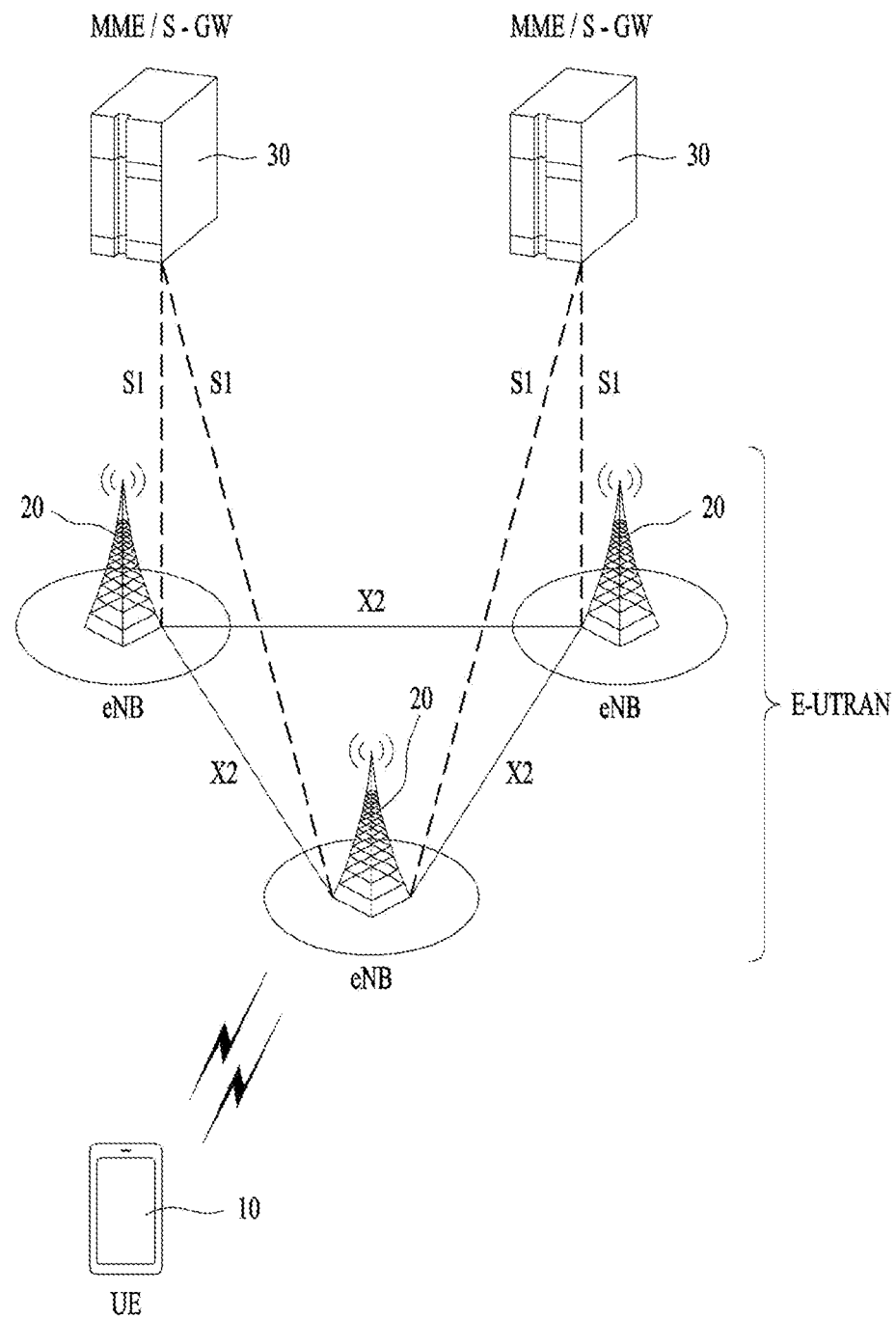
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
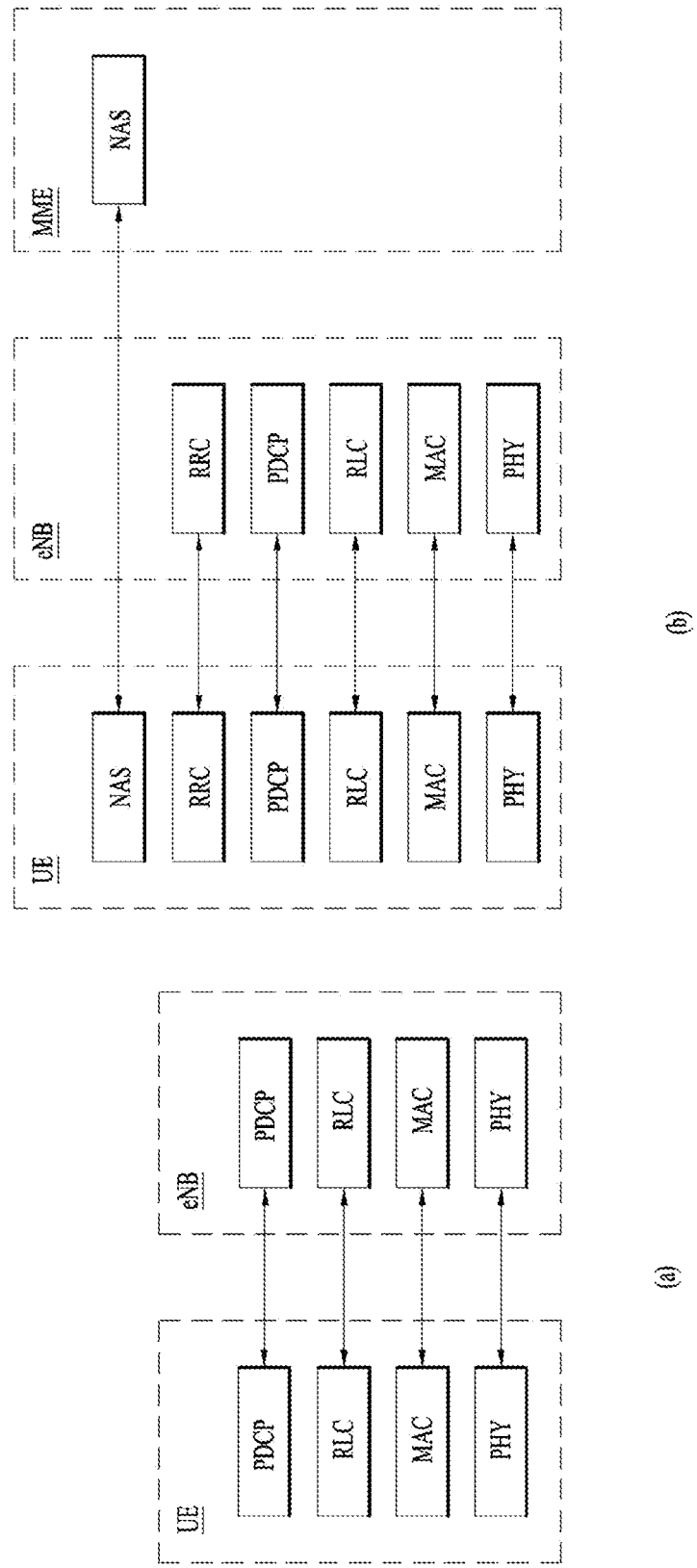
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
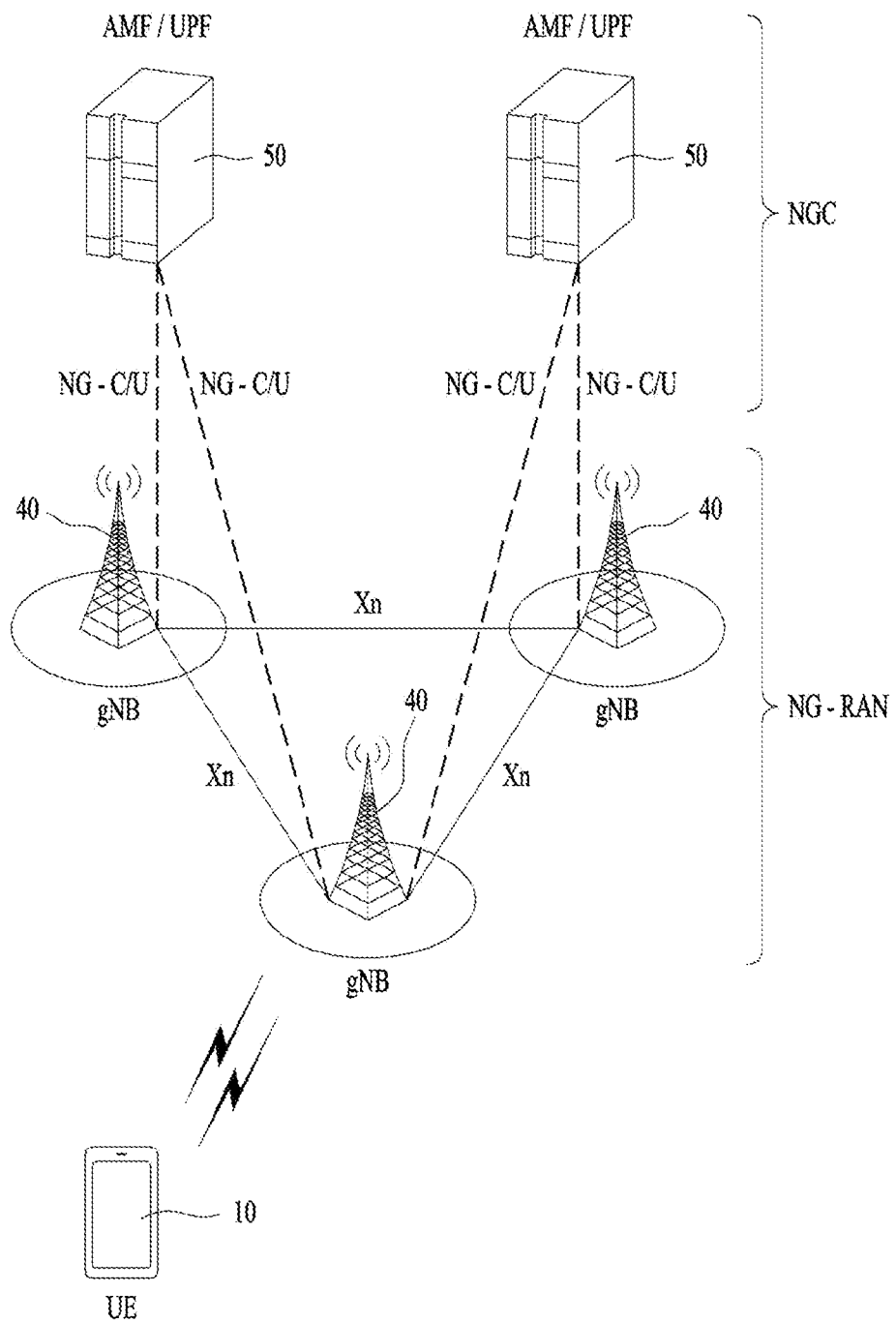
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
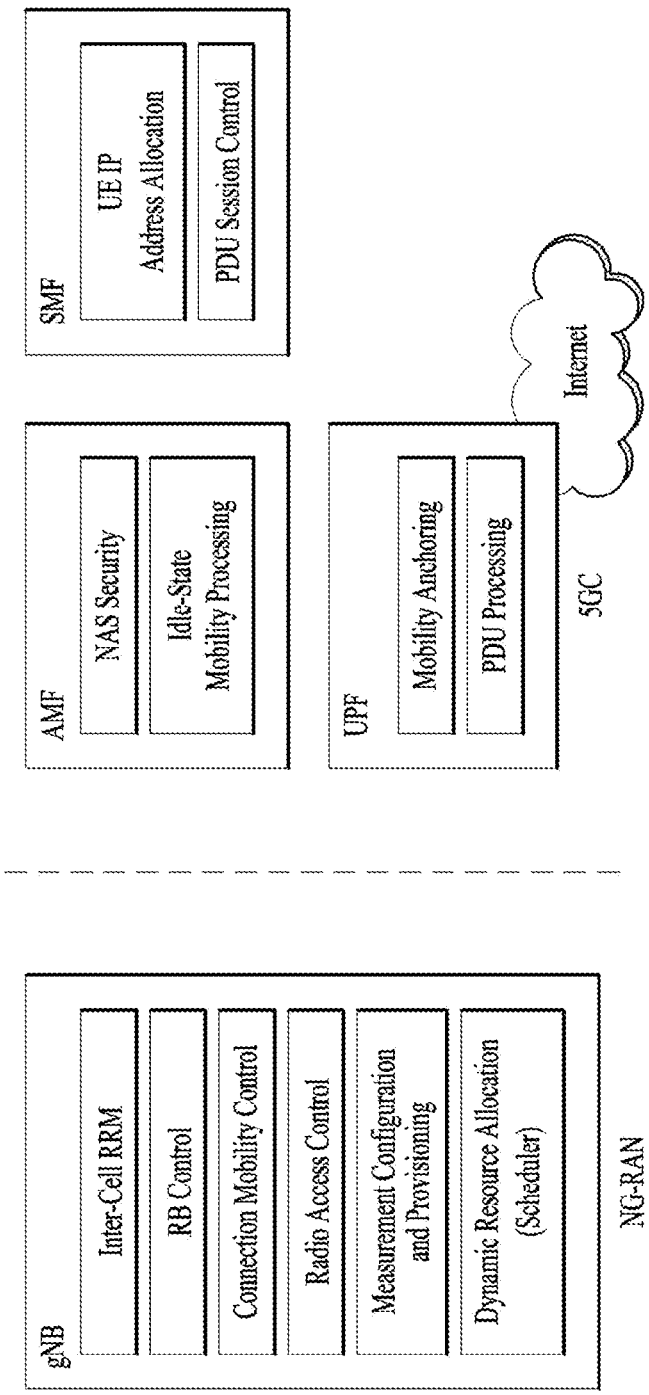
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
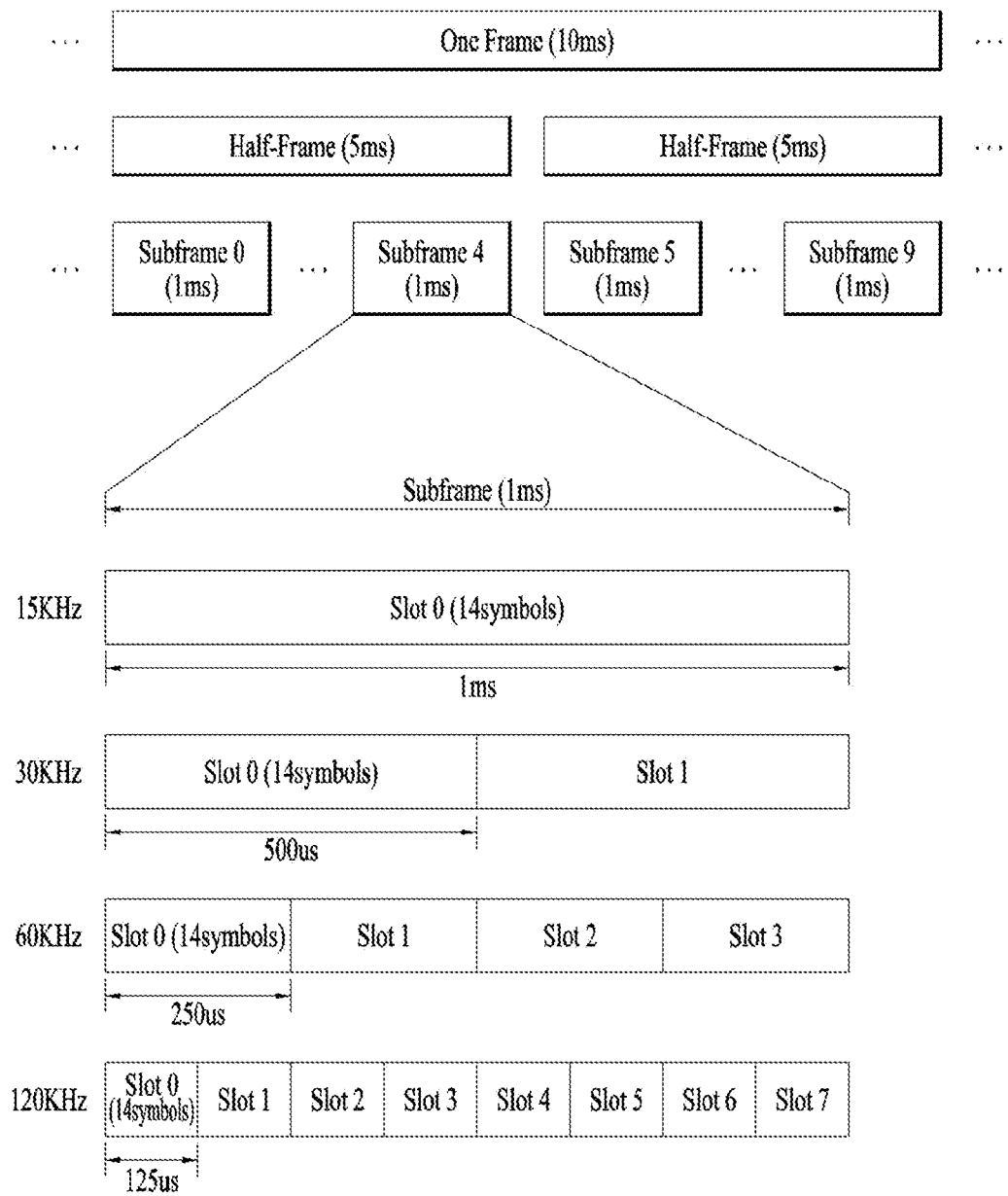
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

[Table 1] below lists the number of symbols per slot $N_{symbol}^{slot}$, the number of slots per frame $N_{slot}^{frame,\mu}$, and the number of slots per subframe $N_{slot}^{subframe,\mu}$ according to an SCS configuration $\mu$ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

[Table 2] below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
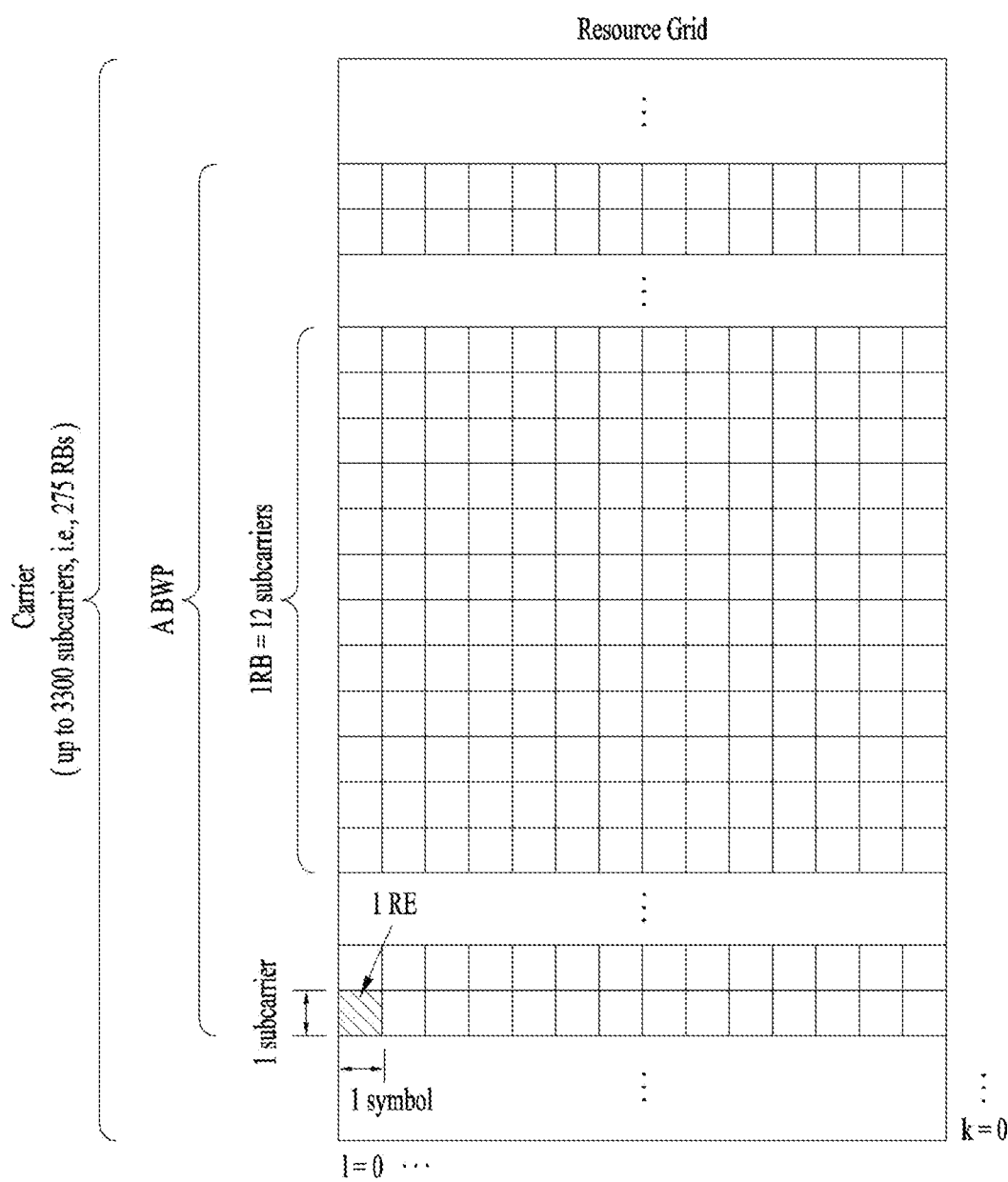
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
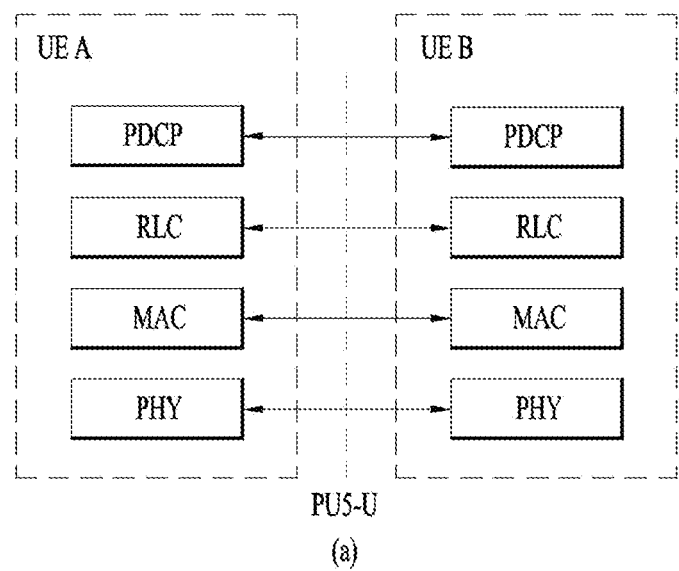
FIG. 8 is a diagram illustrating radio protocol architectures for sidelink (SL) communication according to an embodiment of the present disclosure.
Figure 8:
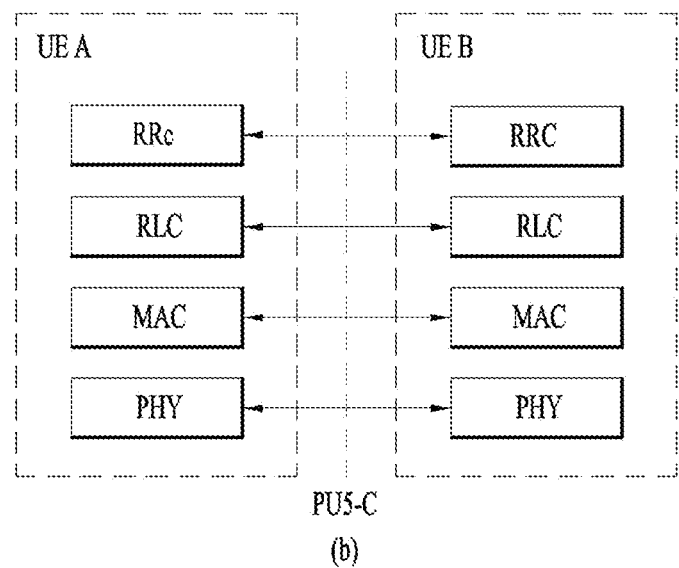

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
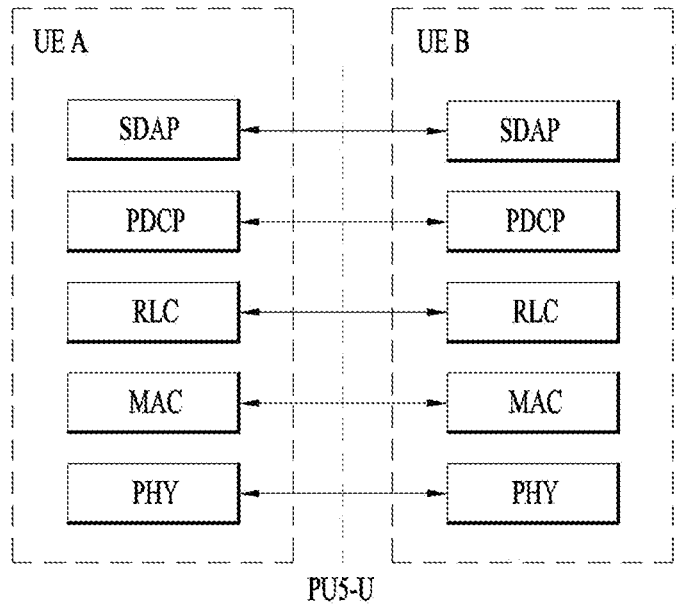
FIG. 9 is a diagram illustrating radio protocol architectures for SL communication according to an embodiment of the present disclosure.
Figure 9:
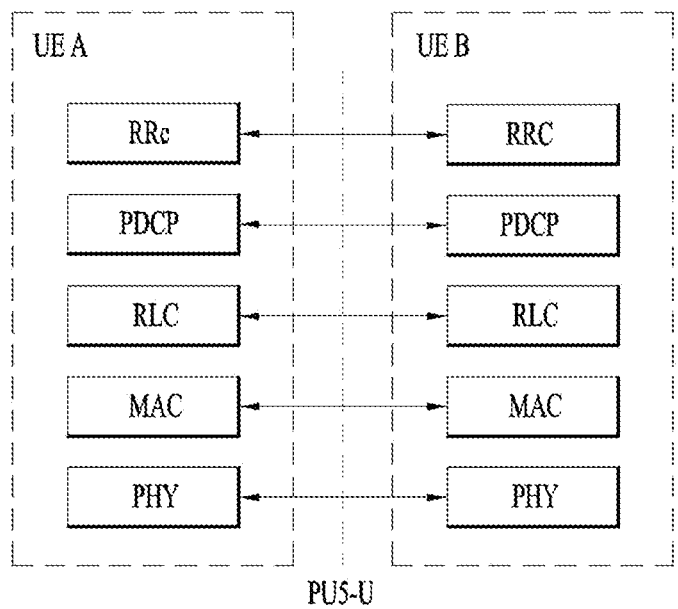

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
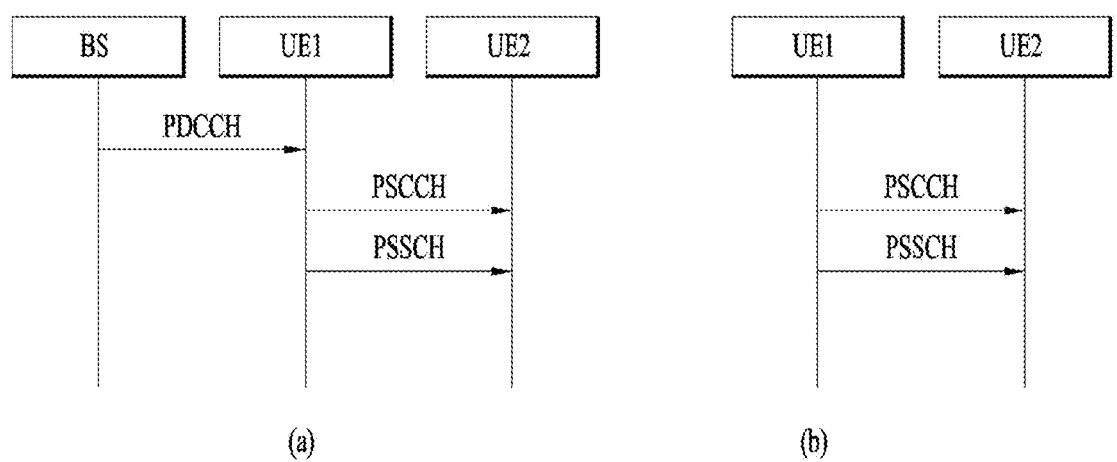
FIG. 10 illustrates a procedure of performing V2X or SL communication according to a transmission mode in a UE according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type SA, and transmit LTE DCI type SA to the LTE SL module every X ms. For example, after the LTE SL module receives LTE DCI format SA from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QoS information (related to transmission traffic/packet), for example, priority information, and/or
- an SL CSI-RS transmission indicator or information about the number of SL CSI-RS antenna ports (to be transmitted);
- location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
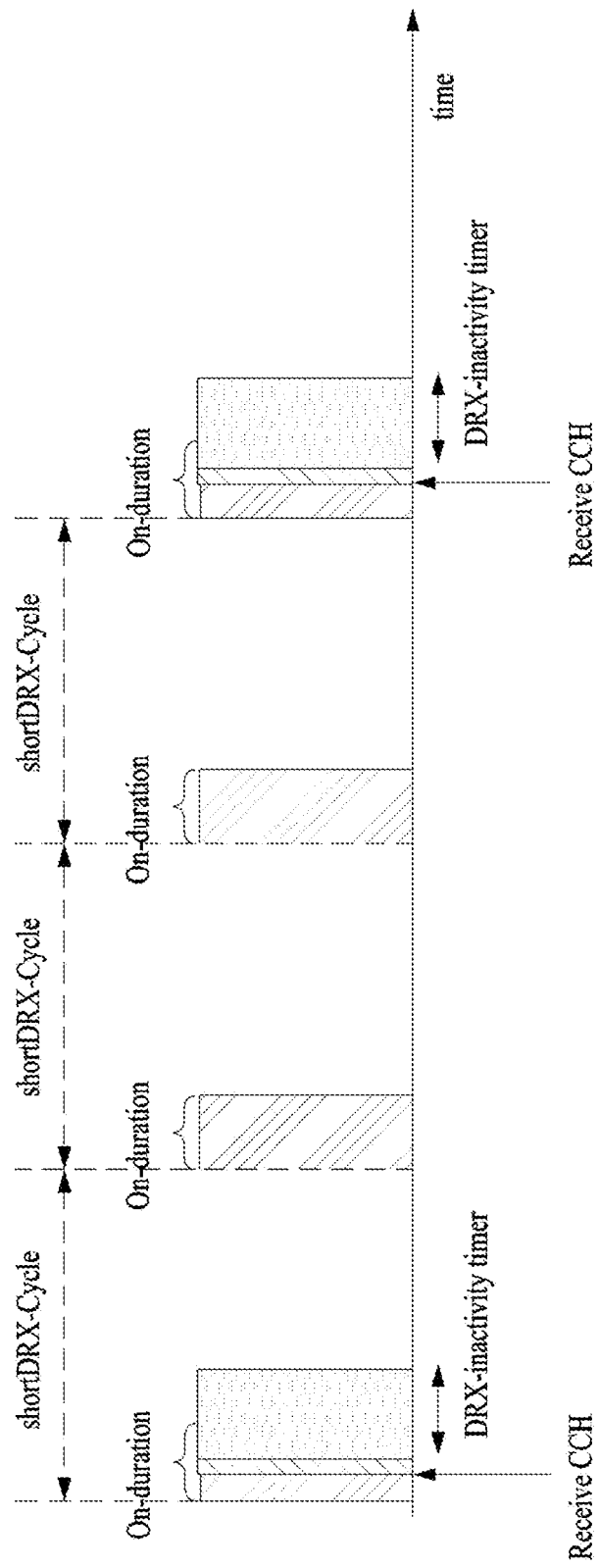
FIG. 11 is a diagram for explaining DRX.

A discontinuous reception (DRX) mechanism may enable a low power operation by performing a wake-up/sleep operation. A wake-up/sleep unit of DRX may be a slot or a subframe, and there may be two types of cycles of a longDRX-cycle and a shortDRX-cycle. FIG. 11 shows the case of the shortDRX-cycle, and the longDRX-cycle may be an integer multiple of the shortDRX-cycle and a time up to the wake-up may be much long. The shortDRX-cycle may be a cycle in which wake-up/sleep is repeated, and the on-duration may be a duration in which a UE wakes up, monitors a channel, and checks whether there is a signal to be received by the UE. That is, during every on-duration period, a PSCCH may be monitored for each subframe/slot to determine whether connection is made. When receiving data required by the UE during the on-duration period, the UE may drive a DRX-inactivity timer to receive the required signal. The DRX-inactivity timer may be operated based on a time, and when another signal is received during the DRX-inactivity timer, the DRX-inactivity timer may be reset, and the DRX-inactivity timer may restart to increase a time for receiving data.

A method of receiving data using the DRX may have loss in terms of latency, but an RF transceiver may be turned off during a sleep duration, thereby reducing power consumption during the corresponding time. Accordingly, this DRX mode may be usefully used in a device that requires a low power operation.

A detailed operation for a DRX operation (which is not related to sidelink and is related to only a Uu interface) of the current LTE will be described below.

- DRX Cycle: This refers to the 'ON_time'+'OFF_time' duration and is embodied in an RRC message.
- onDurationTimer: This refers to the 'ON_time' duration within a DRX cycle.
- drx-Inactivity timer: This refers to how long a UE maintains an 'ON' state after receiving a PDCCH. During a duration in which the timer is 'on', the UE may be maintained in the 'ON state', thereby reducing the 'OFF' duration and increasing the 'ON' duration.
- drx-Retransmission timer: This refers to the number of subframes of the maximum continuous PDCCHs in which the UE needs to be maintained in the 'ON' state in order to be on standby to receive retransmission after a first retransmission time.
- shortDRX-Cycle: This refers to a DRX cycle generated within an off duration of a long DRX cycle. The long DRX cycle corresponds to an integer multiple of the short DRX cycle.
- drxShortCycleTimer: This refers to the number of units of the shortDRX-cycle of a duration in which the shortDRX-cycle is continuously generated after the 'drx-Inactivity timer' expires.
- drxStartOffset: This refers to the position of a subframe in which a DRX pattern starts in a specific SFN.

Figure 12:
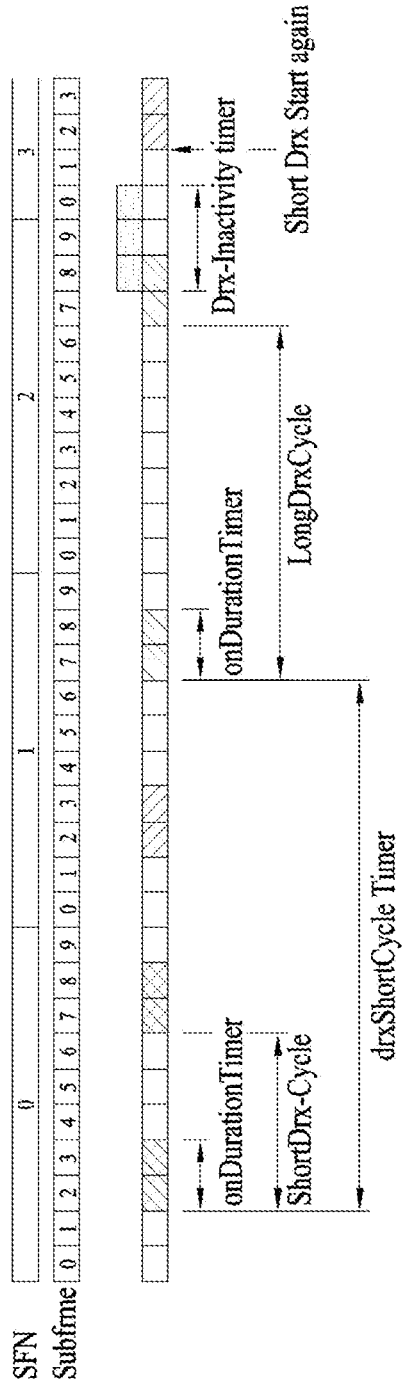
FIGS. 12 to 18 are diagrams for explaining various embodiment(s) related to configuration of DRX.

An example of an operation of entire logic operated based on the parameter is shown in FIG. 12. When a UE receives a message transmitted thereto within an onDuration duration (2-subframe in FIG. 12) of DRX, the UE may be maintain onDuration duration during a drxInactivityTimer (a purple part in FIG. 12, i.e., 3-subframes). When the UE receives a message again during this time, the UE may operate the drxInactiverTimer from a corresponding time (during 3-subframes), and when there is no message to be received by the UE any longer, the UE may release an operation of the drxInactivityTimer. Then, the shortDrx-Cycle may be performed again during drxShortCycleTimer*shortDrxCycle (15-subframes). When there is no data to be received during this period, a low-power UE operating based on DRX may expect that there is no data to be received for a while and may wake up with the LongDrx-Cycle to check whether there is data to be received by the UE.

In this case, the LongDrxCycle (10-subframes) may always be operated with an integer multiple of the ShortDrx-Cycle (5-subframe). In this case, a time when the DRX UE starts the onDurationTimer may use a subframe satisfying the following equation as a starting point.
When operating with ShortDrx-Cycle:

[(SFN*10)+subframe number]modulo(shortDrx-Cycle)=(drxStartOffset)modulo(shortDRX-Cycle)

When operating with ShortDrx-Cycle:

[(SFN*10)+subframe number]modulo(longDrx-Cycle)=(drxStartOffset)  [Equation 1]

Countless number of DRX patterns may be generated according to configuration of the above-described parameter values.

In embodiment(s), it is assumed that a TX UE is a UE that is always in an 'ON' state as a device that does not require low-power communication and that a RX UE is a UE that is connected to the TX UE and requires low-power transmission/reception. For a low-power transmission/reception operation, the RX UE may be operated in a DRX mode, and in this case, a DRX pattern may be determined in cooperation with the TX UE. When the DRX pattern is determined, if there is data to be transmitted to the RX UE, the TX UE may perform mutual communication by transmitting data during the 'on_duration' duration.

Figure 13:
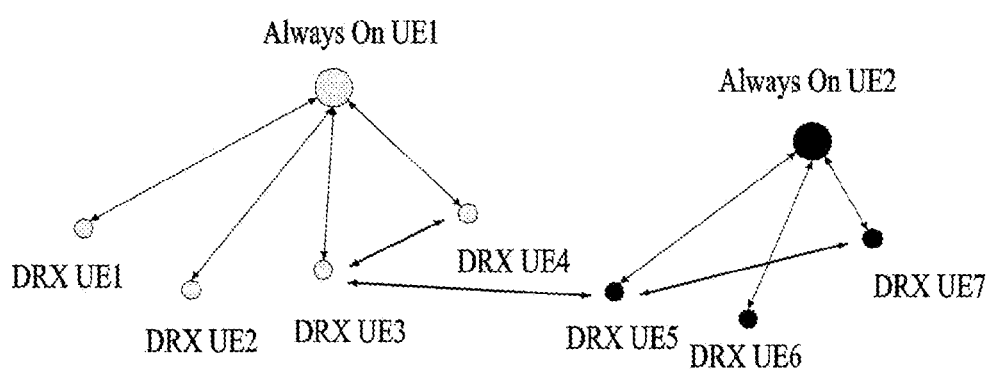

A mutual DRX pattern needs to be known for communication between RX UEs operating in a DRX mode, and as a DRX pattern between RX UEs is matched, the efficiency of a low-power operation may increase. Hereinafter, a problem to be overcome in embodiment(s) of FIG. 13 will be described. It may be assumed that DRX UE1, UE2, UE3, and UE4 connected to an AlwaysOnUE1 may have different DRX patterns and that the AlwaysOnUE1 is capable of knowing the DRX patterns of all DRX UEs connected to the AlwaysOnUE1. It may be assumed that DRX UE5, UE6, and UE7 connected to an AlwausOnUE2 have different DRX patterns and that the AlwausOnUE2 is capable of knowing the DRX patterns of the all DRX UEs connected to the AlwausOnUE2. In this case, for communication between DRX UEs (the DRX UE3 and UE4 or the DRX UE5 and UE7) connected to the same AlwaysOnUE or communication between DRX UEs (the DRX UE3 and UE5) connected to different AlwaysOnUEs, the DRX UEs need to know mutual DRX patterns. There may be various methods of recognizing different DRX patterns between UEs operating in a DRX mode, but embodiment(s) may proposes a method of generating a service specific DRX pattern, and a method of aligning patterns between DRX UEs with respect the same service will be described.

In order to match DRX patterns for respective services, embodiment(s) may propose the following method. Hereinafter, a service ID described in the present disclosure may refer to a specific service ID, a service ID set obtained by grouping specific service IDs, an application ID, or the like.

Figure 14:
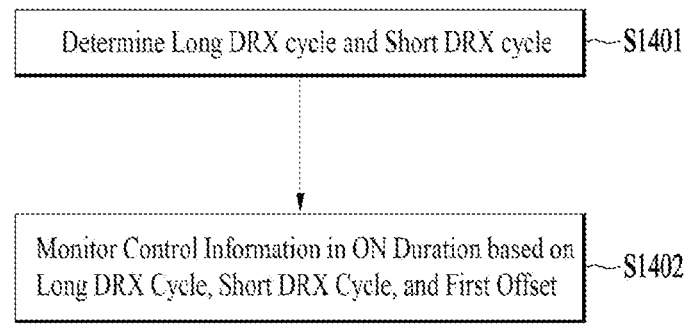

A UE according to an embodiment may determine a Long DRX cycle and a Short DRX cycle (S1401 of FIG. 14) and may monitor control information in an on duration based on the Long DRX cycle, the Short DRX cycle, and a first offset. (S1402 of FIG. 14)

Here, the first offset may be determine as the sum of k times a value related to a sidelink service (k being an integer) and a second offset related to the sidelink service, and the Long DRX cycle and the Short DRX cycle may be determined as m times and n times the value related to the sidelink service (m and n being an integer). In other words, the value related to the sidelink service 'drxRefUnit' and the first offset 'drxRefStartOffset' may be defined, and a value {'longDRX-Cycle', 'shortDRX-Cycle'} or a parameter used to determine the value may be limited to be determined only as an integer multiple of 'drxRefUnit'. That is, within the limit of a multiple of the 'drxRefUnit', it may be possible to generate a DRX pattern suitable for each UE situation according to the remaining amount of power of the UE, a relationship with other services, or the like. A value {'drxStartOffset' } may be limited to be determined only as the sum of integer multiples of 'drxRefStartOffset' and 'drxRefUnit' determined for respective service IDs. The 'drxRefUnit' related to the sidelink service may be defined based on Equation 2 below, and the first offset 'drxRefStartOffset' may be defined based on Equation 3 below. Equations 2 and 3 are separately stated, and thus alpha in Equations 2 and 3 may be different.

shortDRX-Cycle=drxRefUnit*alpha(alpha:Integer)

or/and longDRX-Cycle=drxRefUnit*beta(beta:Integer)

drxStartOffset=drxRefStartOffset+drxRefUnit*alpha (alpha:Integer)

The value related to the sidelink service may be determined may be determined based on a minimum delay related to a specific service. That is, the 'drxRefUnit' may be a default value required to align DRX patterns for a corresponding service and may be a value corresponding to a minimum latency required to use the corresponding service. The 'drxRefUnit' may be (pre)configured as different values depending on service IDs. The 'drxRefUnit' may also be configured as different values depending on a used frequency BWP with respect to the same service ID. The 'drxRefUnit' may be a value that is configured via RRC or MAC CE depending on a service ID received from a higher layer and is transferred to a lower physical layer. Values 'shortDRX-Cycle' and 'longDRX-Cycle' may be restrictedly determined by applying the 'drxRefUnit'.

The 'drxRefStartoffset' may be a default value required to align DRX patterns for a corresponding service. The 'drxRefStartoffset' may be (pre)configured as different values depending on service IDs. The 'drxRefStartoffset' may also be configured as different values depending on a used frequency BWP with respect to the same service ID. The 'drxRefStartoffset' may be a value that is configured via RRC or MAC CE depending on a service ID received from a higher layer and is transferred to a lower physical layer.

Figure 15:
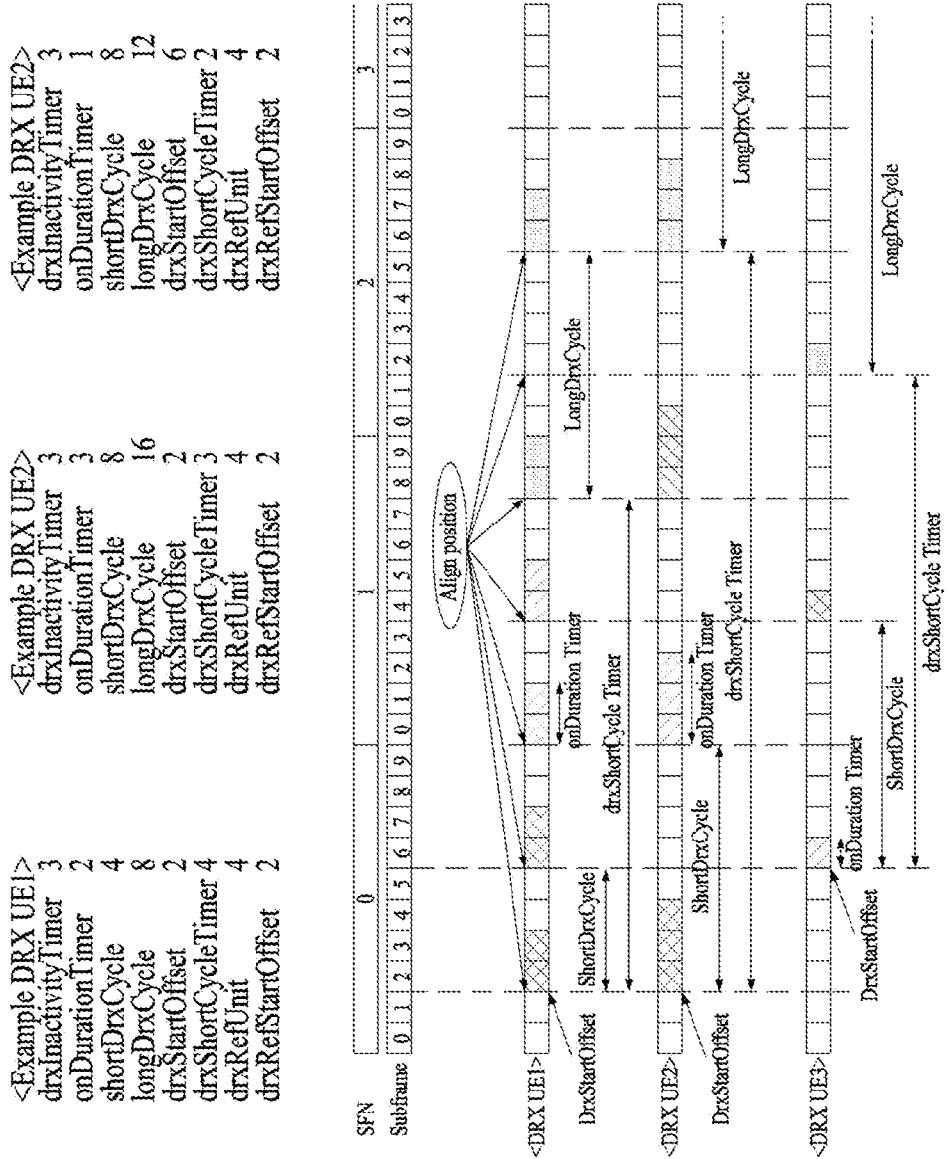

FIG. 15 shows an example of the case in which respective UEs determine DRX patterns for the same service ID. In an example for description, a 'drxRefUnit' is determined as 4 and a 'drxRefStartOffset' is determined as 2. A value of an onDuration length, a ShortDrxCycle, a longDrxCycle, a drxShortCycleTimer, and a drxStartCycleTimer of each UE may be determined as different values depending on the state of each UE. However, when the value may be restrictedly determined based on values 'drxRefUnit' and 'drxRefStartOffset' that are already determined depending on a service ID, multiple UEs operating in a DRX mode may be more likely to be in 'ON' state at a position corresponding to an align position of FIG. 15. FIG. 15 may be limited to the case in which values of the shortDrxCycle and the longDrxCycle of each UE are each an integer multiple of the 'drxRefUnit'. The UE1 and the UE2 may be operated with 2 equal to the 'drxRefStartoffset' as a drxStartOffset value, and the UE3 may be operated with a value corresponding to 1 time the value 'drxRefStartOffset'. As seen from FIG. 15, the UE1 and the UE2, or the UE2, the UE1, and the UE3 may be mutually 'ON' in a partial duration at the align position. In FIG. 15, there is no duration in which the UE2 and the UE3 are mutually 'ON', but for example, the UE2 may predict a time of waking up to an 'ON' state in order to detect the UE3 using the same service. As seen from FIG. 15, when the UE2 wakes up at another align position at which the UE2 is not 'ON' and attempts connection, the UE2 may be connected to the UE3.

As proposed in the embodiment(s), when the values 'drxRefUnit', and 'drxRefStartOffset' are fixed depending on service IDs, DRX patterns may be different depending on the states of the respective UEs. However, it may be possible to estimate a time at which 'onDurationTimer' durations of the respective DRX UEs are inevitably matched or another UE is more likely 'ON'. Thus, as proposed in the embodiment(s), when a DRX pattern is generated depending on a service ID, other UEs using the same service may be easily detected and may easily communicate with each other. As proposed, when the DRX pattern is determined, it may be possible to estimate a time duration in which UEs using the same service are likely 'ON' without mutual negotiation. The duration in which UEs using the same service are more likely 'ON' may be a duration (a unit of 'rdrxRefUnit') corresponding to the align position in FIG. 15 above, and thus the probability of successful connection with other UEs operating in a DRX mode may be high when communication is attempted in the corresponding duration.

The following advantages may be achieved via the above definition.

In terms of service utilization, when DRX UEs interested in the same service wake up in the same time duration as possible, it may be advantageous to exchange necessary information.

Mutual detection may be easy. There is a need for a method of detecting UEs using different DRX patterns for communication therebetween because, even if a UE transmits a discovery message in an 'ON' duration according to a DRX pattern of the UE, another reception DRX UE is not capable of receiving the transmitted message if the reception DRX UE is not in an 'ON' state. However, when it is possible to align DRX patterns for a specific service, even if a UE do not know a DRX pattern of the other party in advance, the UE may easily detect a UE using the same service. This is because other UEs interested in the same service in a duration in which the UE is 'ON' is also likely to be 'ON'.

According to an embodiment, it may be possible to effectively use a frequency. When an 'Always ON' UE broadcasts a specific service, if UEs interested in the corresponding service are simultaneously 'ON', it may be possible to transfer the corresponding information to multiple UEs even with a single broadcast. In this respect, matching the DRX pattern for the same service may be a method of increasing frequency use efficiency.

Hereinafter, various examples of a method of configuring a relationship between a sidelink service (or a service ID) and a value related to a sidelink service 'drxRefUnit' and first offset 'drxRefStartOffset' will be described. That is, in order to facilitate discovery between UEs operating in a DRX mode, a method of determining a DRX pattern using various methods will be proposed as follows.

The value related to the sidelink service and the second offset may be differently configured for respective sidelink services. That is, in order to fix DRX patterns for the same service, values "drxRefUnit" and "drxRefStartOffset" may be determined for each service as proposed above, and when values {drxShort-cycle, drxLong-cycle, drxStartOffset} used in actual DRX pattern generation are determined, a DRX pattern may be determined using the above-described method using the proposed values "drxRefUnit" and "drxRefStartOffset".

Figure 16:
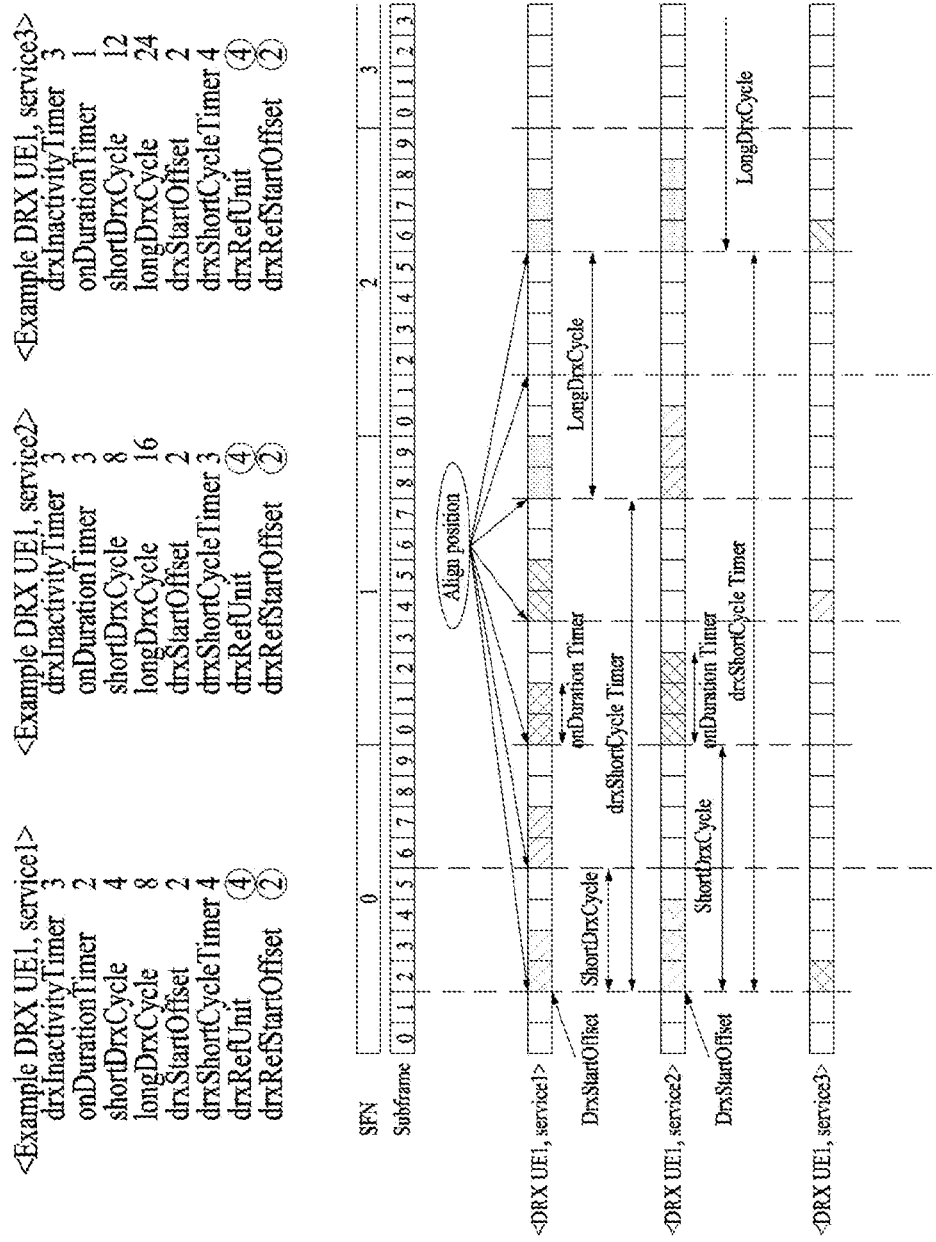

The value related to the sidelink service and the second offset may be configured as the same value irrespective of a sidelink service. The same "drxRefUnit" and "drxRefStartOffset" may be used when various services are used, and thus when {drxShort-cycle, drxLong-cycle, drxStartOffset} for each service is determined using the above-described method, an align position may also be easily predicted in the case of UEs using different services. FIG. 16 shows an example in which UEs use different services but a DRX pattern is configured using the above-proposed method depending on a common "drxRefUnit" and "drxRefStartOffset". In this case, when the discovery message is transmitted at a position corresponding to a multiple of the drxRefUnit based on the drxStartOffset value, detection probability may be increased.

The ranges of values to be selected as m and n may be configured for each sidelink service, and the ranges of values to be selected as m and n may at least partially overlap each other. In more detail, a method of determining a drxShort-cycle and a drxLong-cycle for each service when the same "drxRefUnit" and "drxRefStartOffset" are applied for each service may be limited. Since a cycle range of short-cycle/long-cycle may be changed for each service, the cycle range may be determined as follows. As exemplified in Equation 4, the range of alpha and beta values multiplied by the drxRefUnit for each service may be limited. In this case, the drxRefUnit may be said to be a kind of resolution value for determining the DRX pattern. When the alpha and beta values for each service are limited, discovery may be possible by differentiating the case in which only the same service is to be discovered and the case of discovering all neighboring UEs operating in DRX. For example, when a UE using a service 3 is to be mainly discovered, a discovery message may be transmitted with a period of '7*drxRefUnit corresponding to a lower limit of the alpha, and when a UE using a service 1 is to be discovered, the discovery message is transmitted with a period of '3*drxRefUnit', other DRX UEs that use the same service while maintaining a moderately low-power operation may be detected. In the following example, patterns of all services are aligned using the proposed method, and thus when the discovery message is transmitted to detect the service 1, all neighboring DRX UEs using different services may be detected.

shortDRX-Cycle=drxRefUnit*alpha(alpha:Integer)
or/and longDRX-Cycle=drxRefUnit*beta(beta:Integer)   [Equation 4]

Service 1: 3<alpha <6
Service 2: <alpha <9
Service 3: 7<alpha <12

In another example, determination of values 'drxStartOffset' and 'drxShort-cycle' used to determine a general DRX pattern irrespective of the proposed values "drxRefUnit" and "drxRefStartOffset" may be limited. For example, a value 'drxStartOffset' may be fixed for all services or may be determined only within a predetermined range, and a value 'drxShort-cycle'/'drxLong-cycle' for each service may be determined only as an integer multiple of the same value for each service. A range of the generated integer multiple may be different for each service. For example, the drxShort-cycle may be determined as an integer multiple of 4 and may have the following range for each service. A value to be selected as the drxShort-cycle of the service 1 may be {4, 8, 12}, a value to be selected as the drxShort-cycle of the service 2 may be {12, 16, 20}, and a value to be selected as the drxShort-cycle of the service 3 may be {20, 24, 28}. When the values are determined as such, a duration in which the discovery message needs to be transmitted to detect UEs using the same service and a duration in which the discovery message needs to be transmitted to detect all neighboring UEs may be easily inferred.

Figure 17:
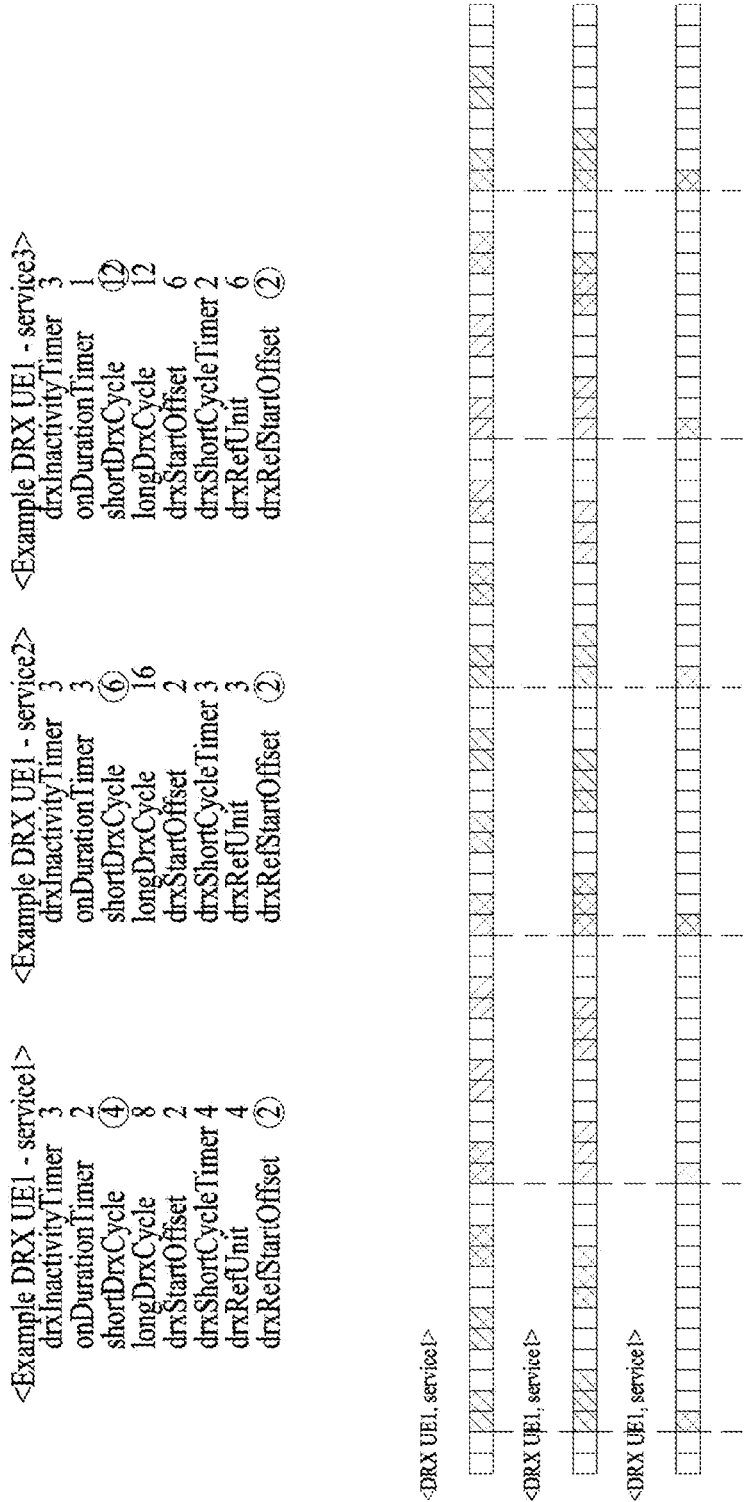

In another example, a value 'drxRefStartOffset' of DRX for each service may be fixed, and the drxRefUnit may be freely determined. When the values are determined as such, UEs operating in a DRX mode may be more likely to be simultaneously 'ON' at a position corresponding a least common multiple of the drxRefUnit for each service, and thus the UEs operating in the DRX mode may be discovered. FIG. 17 shows the case in which the drxRefStartOffset is fixed to 2 and the drxRefUnit have different values. All 'ON' states may be aligned at a corresponding to a least common multiple of drxRefUnit values.

In another example, determination of values 'drxStartOffset' and 'drxShort-cycle' used to determine a general DRX pattern irrespective of the proposed values "drxRefUnit" and "drxRefStartOffset" may be partially limited. For example, the value 'drxStartOffset' may be fixed for all the respective services or may be determined only within a predetermined range, and when a value 'drxShort-cycle'/'drxLong-cycle' for each service may be determined as an integer multiple of a value determined for each service. The range of the integer multiple may be different for each service. For example, a value to be selected as the drxShort-cycle of the service 1 may be {4, 8, 12}, a value to be selected as the drxShort-cycle of the service 2 may be {3, 6, 9}, and a value to be selected as the drxShort-cycle of the service 3 may be {6, 12, 24}. When the values are determined as such, a position at which the discovery message is transmitted to detect UEs using the same service and a duration in which all neighboring UEs are 'ON' may be easily inferred. In the above example, the duration for detecting all neighboring UE may be a position corresponding to a least common multiple of all selectable cycle values.

In another example, DRX patterns to be generated may be distributed not to overlap as possible. When the 'drxRefUnit' and drxRefStartOffset' values for each service are configured to be relative prime as possible (relationship without a divisor), the DRX pattern for each service may be distributed. That is, this is a method of increasing randomness. When the values are configured as such, UEs supposed to search for different services may make a random DRX pattern and may transmit the discovery message. As such, the probability of discovering neighboring DRX UEs may be increased.

In another example, positions of the 'drxStartOffset' and the 'drxShort-cycle/drxLong-cycle' may be arranged not to overlap as possible. For example, the positions may be arranged in such a way that the 'drxStartOffset' and the 'drxShort-cycle/drxLong-cycle' for each service do not overlap as possible. When the positions are arranged as such, various services do not wake up simultaneously to an 'ON' state, and thus the probability in that inevitable collision or interference occurs in communication of different services may be low. When the positions are configured as such, UEs supposed to search for different services may make a random DRX pattern and may transmit the discovery message. As such, the probability of discovering neighboring DRX UEs may be increased.

In another example, a duration in which a UE needs to wake up irrespective of a service may be configured. In detail, a DRX operation may be performed to differentiate between an alarm message and an event message. For example, all UEs operating in a DRX mode may be simultaneously maintained in an 'ON' state in a time duration in which it is possible to transmit the alarm message irrespective of a service. The alarm message may have different sequences for respective services, and only whether there is a service may be checked through the sequence. When a service in which a UE is interested is present, the UE may maintain an 'ON' duration at a preconfigured time and may receive a desired service.

Figure 18:
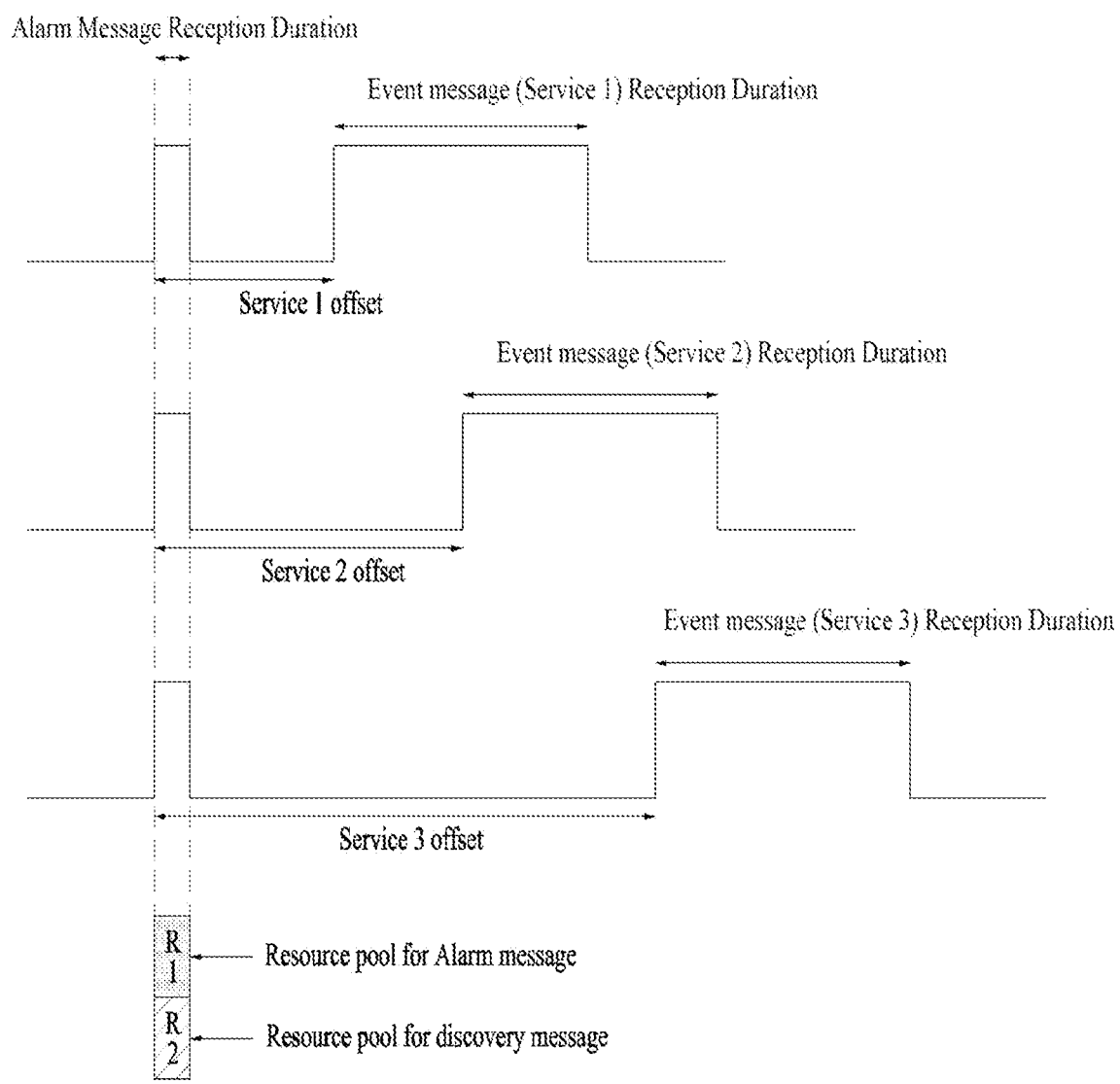

FIG. 18 shows this operation. An offset time at which a service is actually transmitted after the alarm duration may be a preconfigured value or may have different values for respective services. A service having a high priority in terms of latency may have the shortest offset value. In this case, arrangement of a discovery resource pool in the alarm duration in order to detect UEs operating with different DRX patterns may be proposed. The alarm signal and the discovery message may each be a message with high importance, and thus a resource pool for the alarm message and a discovery resource pool may be differentiated and may be arranged at the same time using an FDM method. In this case, it may be possible to discover UEs with each other using different DRX patterns by transmitting the discovery message in the alarm duration.

When DRX patters for respective services are aligned using the value 'drxRefUnit', UEs using the same service may detect with each other using the following method. That is, generation of DRX patterns for respective service IDs using the above-described method is limited, initial detection may be performed using the following method.

For example, a UE that wants connection may broadcast a discovery message thereof. In detail, a 'maxLongDrxCycle' in which a service needs to be 'ON' once within a predetermined time for each service ID may be determined. A UE that attempts connection with other US operating in DRX may wake up to an 'ON' state at every align position using the values 'drxRefStartOffset' and 'drxRefUnit' during the 'maxLongDrxCycle'. The DRX UE that broadcasts the discovery message at the align position during the 'maxLongDrxCycle' and receives the discovery message may detect DRX UEs using the same service ID by responding to the discovery message. The response to the discovery message may also be transmitted at the align position. Alternatively, during the discovery message broadcast and the response thereto, each UE may perform an operation for next connection according to a DRX pattern of the other party by further transmitting DRX pattern information of each UE itself.

In another example, all DRX UEs may broadcast the discovery message during a specific time duration. In detail, in a specific determined time range, or when a specific UE triggers the discovery time duration, DRX UEs using the same service may wake up to an 'ON' service at every align position during the 'maxLongDrxCycle' (which will be referred to as the discoveryTimer) from a corresponding time. In this case, the align position may be determined as values 'drxRefStartOffset' and 'drxRefUnit'. All DRX UEs may further broadcast ID information thereof and simple information required for discovery at the align position during the discoveryTimer duration. In this case, the included information may include DRX pattern information. The DRX UE that receives the discovery message at the align position may be capable of recognizing IDs and DRX patterns of neighboring DRX UEs using the same service and may attempt connection therethrough.

In the case of this operation, the discovery message may be more likely broadcast at a position corresponding to the align position. Thus, several subframes corresponding to a starting point of the align position may be configured as an exclusive duration for transmission of the discovery message or the discovery message may have a higher priority than other data messages in the corresponding duration, thereby increasing the probability of mutual connection.

DRX UEs that detect with each other through the discovery message may change DRX patterns thereof through negotiation, etc., but as long as the same service is used, it may be still obvious to comply with a method of determining limited values of shortDrxCycle, longDrxCycle, and startDrxOffset.

In a conventional DRX operation, when UEs know the above-described DRX_pattern={DRX Cycle, onDurationTimer, drx-Inactivity timer, drx-Retransmission timer, short-DRX-Cycle, drxShortCycleTimer, drxStartOffset} with each other, a UE may recognize a duration in which another UE is 'ON'. However, like in the embodiment(s), when a pattern values are determined for each service ID, the corresponding service may be recognized using only information of a single DRX_pattern set. Thus, in order to recognize patterns for all the respective services, DRX_pattern values need to be indicated for various service IDs being used, and Equation 5 show an example for this.

For 1: the number of used service ID

DRX_pattern={DRX Cycle,onDurationTimer drx-Inactivity timer,drx-Retransmission timer,short-DRX-Cycle,drxShortCycleTimer,drxStartOffset}
End loop [Equation 5]

Hereinafter, a complementary method and a resource selection method when it is not possible to perform sufficient sensing via an operation in a DRX mode for low power in relation to sidelink DRX will be described. Hereinafter, the DRX operation may be based on the above description. Alternatively, the DRX operation may also be applied independently applied from DRX according to the above-described embodiment.

The following operation situation may be assumed in operations according to the embodiment(s). A UE1 may be assumed to be a UE operating in a DRX mode for low-power transmission/reception, and a UE2 may be assumed to be a UE that does not require a low-power operation and is always in an 'ON' state (which is interpreted to be the state in which an ON duration is relatively long). A communication relationship between the UE1 and the UE2 may correspond to a relationship between a wearable device and a personal mobile device with small sensors attached thereto, or between a personal mobile device and a vehicle/RSU.

For convenience of description, in embodiment(s), a UE operating in a DRX mode may be referred to as the UE1, and a UE that is always in an 'ON' state may be referred to as the UE2. The case in which the UE1 and the UE2 operated in V2X mode2 sidelink may be divided into the case in which a duration to be sensed within a sensing window during a DRX mode operation is equal to or greater than a predetermined value, the case in which a duration to be sensed within a sensing window during a DRX mode operation is present but is less than a predetermined value, and the case in which a duration to be sensed within a sensing window during a DRX mode operation is not present, depending on a cycle and length of the ON_DURATION of the DRX mode. In this case, a time for the sensing window may be assumed to be an already determined time length required before a transmitted resource is selected.

First, the case in which the duration (ON_DURATION) to be sensed within the sensing window during the DRX mode operation is equal to or greater than a predetermined value will be described.

The DRX pattern (a period or an ON-DURATION length) may be determined according to the remaining power of a low-power UE, latency requirement, the properties of a service as a communication target, or the like. The UE1 operating in the DRX mode may wake up with a predetermined cycle according to a DRX pattern and may check whether data transmitted to the UE1 is present, and when the data is present, the ON_DURATION duration may be increased (DRX in-activity) to receive information. In contrast, when the UE1 operating in the DRX mode intends to transmit data to the UE2 that is always in an ON state, the UE1 may wake up according to the DRX pattern and may transmit data, but irrespective of this, when the data to be transmitted is present, the UE1 may immediately wake up and may transmit the data.

For transmission in a Sidelink mode2 operation, a channel may be sensed during a predetermined time (sensing window), the positions of the currently used resource and a reserved resource may be checked, the position of a resource to be transmitted may be found, and transmission may be attempted. A UE operating in a DRX mode may be capable of performing sensing only at a position corresponding to the ON_DURATION duration (partial sensing). A method of finding a resource to be transmitted only through the partial sensing may be useful in some cases, but the probability of selecting an inappropriate wrong transmission resource due to lack of sufficient sensing may be high. To this end, determination of the 'minimum time required for sensing' may be proposed. This value may be predetermined or may also be changed depending on a channel situation (e.g., CBR), etc. The value may be a shorter time than a general sensing window time. When the ON_DURATION duration of a predetermined DRX pattern within the sensing window is greater than the 'minimum time required for sensing', the corresponding UE1 may select a resource to be used in transmission based on the current sensing value.

Hereinafter, when the duration to be sensed within a sensing window during a DRX mode operation is present but is less than a predetermined value, a resource required for transmission may be selected based on at least one of various methods below.

For example, in the case in which there is data to be transmitted by the UE1 operating in a DRX mode, the 'minimum time required for sensing' is not satisfied within the sensing window to select a resource for this case, the UE1 may increase the ON_DURARION duration to satisfy the 'minimum time required for sensing' to sense a resource. That is, by increasing the ON_DURATION duration, a minimum resource collection duration required for sensing may be satisfied and then a resource may be selected. In this case, the ON_DURATION duration needs to be increased for resource sensing, and thus power consumption may be increased, and there may be a loss in terms of latency by as much as a time consumed for sensing.

In another example, the UE2 may always be in an 'ON' state, and thus the UE1 capable of performing only partial sensing may refer to information on a resource sensed by the UE2 when sensing a resource with assistance of the information on the resource. When there is data to be transmitted by the UE1, the UE1 may immediately wake up from a sleep mode of DRX to make a request to the UE2 for sensing information. In this case, the UE1 may select a resource for the sensing information request based on the result of partial sensing of the UE1. An operation process for this may be described as follows.

Step1) When there is a resource to be transmitted, the UE1 may transfer information on a priority and a size of a message to be transmitted to the UE2 by the UE1 and may make a request for sensing resource information corresponding thereto.

Step2) The UE2 may inform the UE1 about the sensing result (e.g., position information map of effective resources) based on the priority and size of the message to be transmitted by the UE1.

Step3) The UE1 may select a transmission resource using the result of sensing information using the result of the partial sensing of the UE1 and the result of sensing information assisted from the UE2. In this case, the UE1 may select the transmission resource within a common effective resource of the resource information sensed by the UE1 and the resource information received from the UE2.

When this method is used, signaling overhead may be disadvantageously increased for resource selection. However, a resource with a low probability of collision may be advantageously selected by compensating for limitation of partial sensing of the UE1 as a low-power UE.

In another example, when there is data to be transmitted by the UE1, the UE1 may immediately wake up to make a request to the UE2 for information on the sensing result irrespective of a DRX pattern of the UE1 and may receive a response to the request during the ON_DURATION duration of the DRX pattern. In this case, when requesting the sensing information, the UE1 may transfer the size and priority information of data to be transmitted by the UE1 to the UE2. The UE2 that receives the request for the sensing information may transfer the sensing information to the UE1 according to the ON_DURATION of the DRX pattern of the UE1. In this case, the sensing information may be a value indicating a resource map to be used in transmission with reference to the size and priority of data to be transferred by the UE1.

Figure 19:
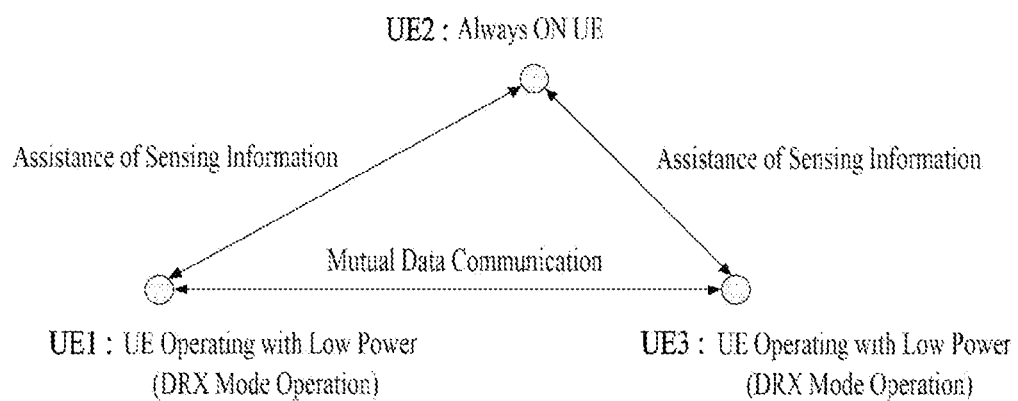
FIGS. 19 to 20 are diagrams for explaining an example related to DRX related sensing.

When the sensing information is assisted to transmit data during the ON_DURATION duration of DRX, the following communication may be considered. As shown in FIG. 19, it may be assumed that another adjacent UE3 that knows the DRX pattern of the UE1 is present and that the UE1 and the UE3 communicate with each other according to the DRX ON_DURATION. The case of this communication may refer to the case in which the UE1 receives assistance of the UE2 when selecting a resource communication with the UE3 under the assumption in that all the UEs 1, 2, and 3 are present within a short distance and that sensing information of the UE2 that is always in an 'ON' state is also applicable to the UE1. The UE1 receives assistance from the UE2 with regard to the sensing information of the effective resource and actual communication is performed between the UE1 and the UE3, and thus there is a need for a method of selecting a resource according to the ON_DURATION of DRX. Similarly, the UE3 may also receive assistance of the UE2 when selecting a transmission resource.

In another example, when data to be transmitted by the UE1 is generated, if the UE1 wakes up from a sleep state and makes a request to the UE2 for an assistant message, the UE2 may recommend the UE1 to switch a DRX mode to an 'ON' state at a position at which available resources are empty to the greatest extent based on the sensing result of the UE1 rather than transmitting the sensing result (assistant message). The UE1 may select an effective resource based on the sensing result of the UE1 at the recommended position and may then use the selected effective resource as a transmission resource. When this method is used, signaling overhead may be small compared with the case in which entire effective resource information is transferred based on the sensing result, but it may be disadvantageous that the sensing result of the UE1 operating in a DRX mode is insufficient still.

In another example, when data to be transmitted by the UE1 is generated, if the UE1 makes a request to the UE2 for an assistant message, the UE2 may reserve resources for transmission of the UE1 instead. In this case, an operation process is as follows.

Step1) The UE1 may make a request to the UE2 for sensing information for a transmission resource with information such as a priority, a size, and a desired retransmission number of times of the data to be transmitted by the UE1.

Step2) The UE2 may reserve data appropriate for transmission requirements of the UE1 based on sensing information of the UE2.

Step3) The UE2 may inform the UE1 about (position) information of a reserved resource.

Step4) The UE1 may transmit data to a corresponding resource position.

In another example, the UE2 that is capable of always sensing a resource may reserve a resource in the ON_DURATION duration without a particular assistant message request for the UE1 operating in a DRX mode. In this case, the UE2 may inform that the UE2 reserves a resource instead of the UE1. The UE2 needs to inform the UE1 about (position) information of the reserved resource, and the UE1 may transmit data to the reserved resource position. This method may overcome the sensing limit of the UE1, but even when there is no data to be transmitted by the UE1, a resource is always reserved, and thus it may be disadvantageous that it is not effective to use the resource.

Hereinafter, the case in which the duration (ON_DURATION) to be sensed within the sensing window during the DRX mode operation is not present will be described.

Figure 20:
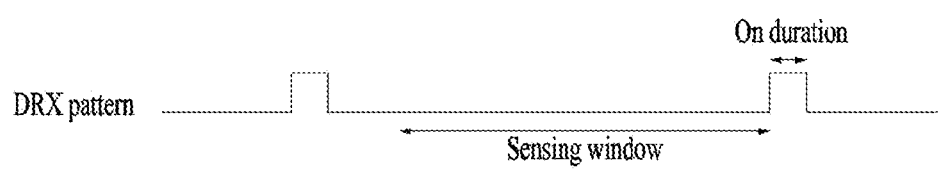

When an ON_DURATION cycle of a DRX mode is small, that is, when a low-power operation is strongly required, the case in which there is no ON_DURATION within the sensing window may be present as shown in FIG. 20.

In this case, a method that is similar to the above-described embodiments in which a duration to be sensed within the sensing window during a DRX mode operation but is less than a predetermined value but is slightly modified may be applied. The method may be different from the above-proposed embodiments in that the UE1 operating in a DRX mode needs to sense and select a source for the assistant message when the UE1 needs to make a request the UE2 for the assistant message for resource selection since there is not even a result of partial sensing. The sensing duration for an assistance request may be much smaller than a sensing duration that is generally used to transmit data. A priority of the assistant message applied when a resource for transmission of the assistant message may be a value having higher priority than a priority of data to be transmitted.

For example, when there is data to be transmitted by the UE1 operating in a DRX mode, the ON_DURATION duration may be increased by the sensing window, and data may be transmitted through general V2X sensing and resource selection processes.

In another example, since there is no sensing result for the duration corresponding to the sensing window, the UE1 may make a request to the UE2 for a sensing result (or assistant information for resource selection). A detailed method therefor will be descried below.

The UE1 (DRX mode) may make a request to the UE2 (always 'ON') for assistance information for resource selection. As described above, the UE1 may sense a resource for a short time, may then select a resource for making a request to the UE2 for assistance information based on the sensing result, and may then transmit an assistant request message. In this case, the UE1 may transfer information on a priority and size of data to be actually transmitted. Alternatively, the UE1 has no sensing information, and thus the UE2 may reserve a resource for an assistance message to be requested in a duration in which the UE1 is 'ON' in the name of the UE1. The UE1 may be notified of a reserved portion, and thus there is a message to be transmitted by the UE1, the UE1 may make a request to the UE2 for the assistant message through the reserved position.

The UE2 may notify the UE1 about assistance information for resource selection. The UE2 receiving a corresponding message may transfer resource information (resource map) sensed by the UE2 to the UE1. Alternatively, the UE2 may notify the UE2 about resource candidate(s) to be appropriately to be used by data to be transferred by the UE1. Alternatively, a resource at a specific position may be specified. Alternatively, the UE2 may reserve a resource appropriate to be used to transmit data by the UE1 instead of the UE1 and may also notify the UE1 about the information.

Then, the UE1 may select a resource and may transmit a message. The UE1 may transfer a data message using information of sensing information result transmitted by the UE2/resource candidate position appropriate for use/resource at a specific position/reserved resource.

Examples of communication systems applicable to the present disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
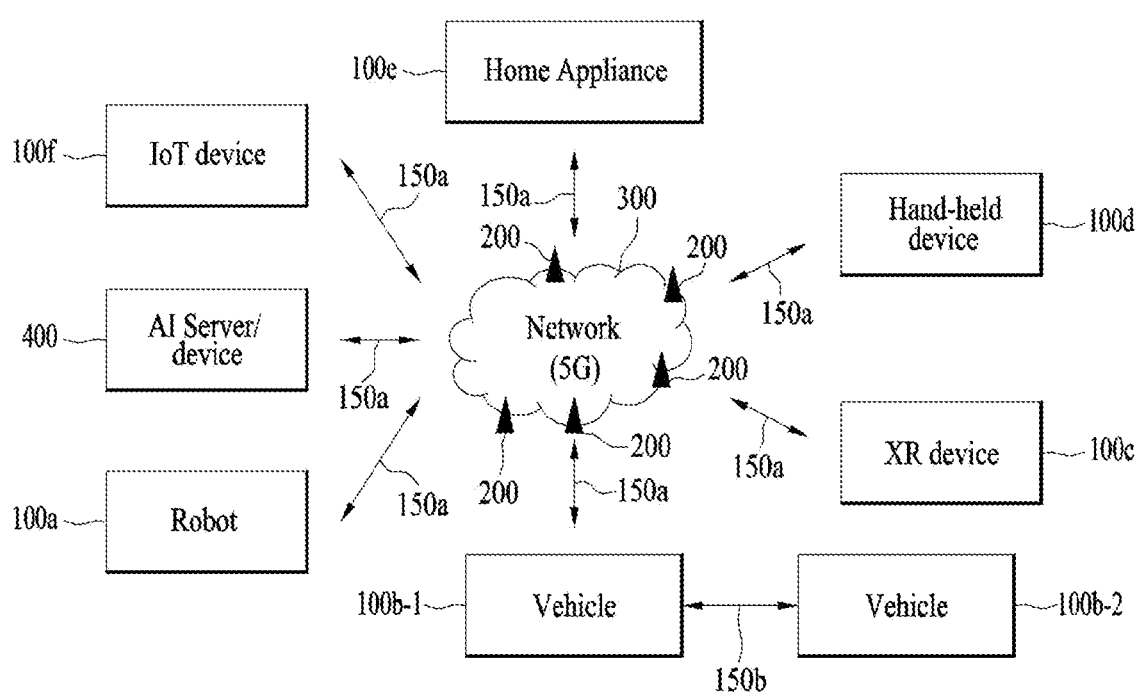
FIGS. 21 to 27 are diagrams for explaining various embodiments to which embodiment(s) are applicable.

FIG. 21 illustrates a communication system 1 applied to the present disclosure.

Referring to FIG. 21, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of wireless devices applicable to the present disclosure

Figure 22:
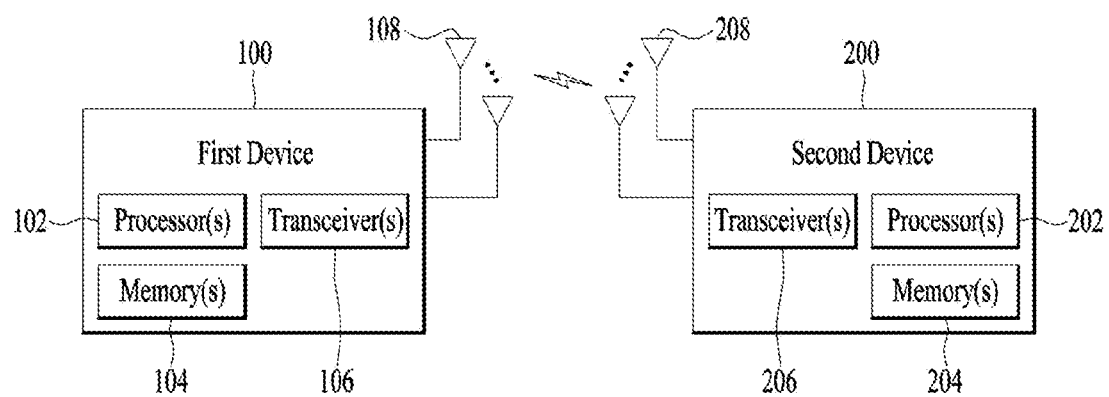

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
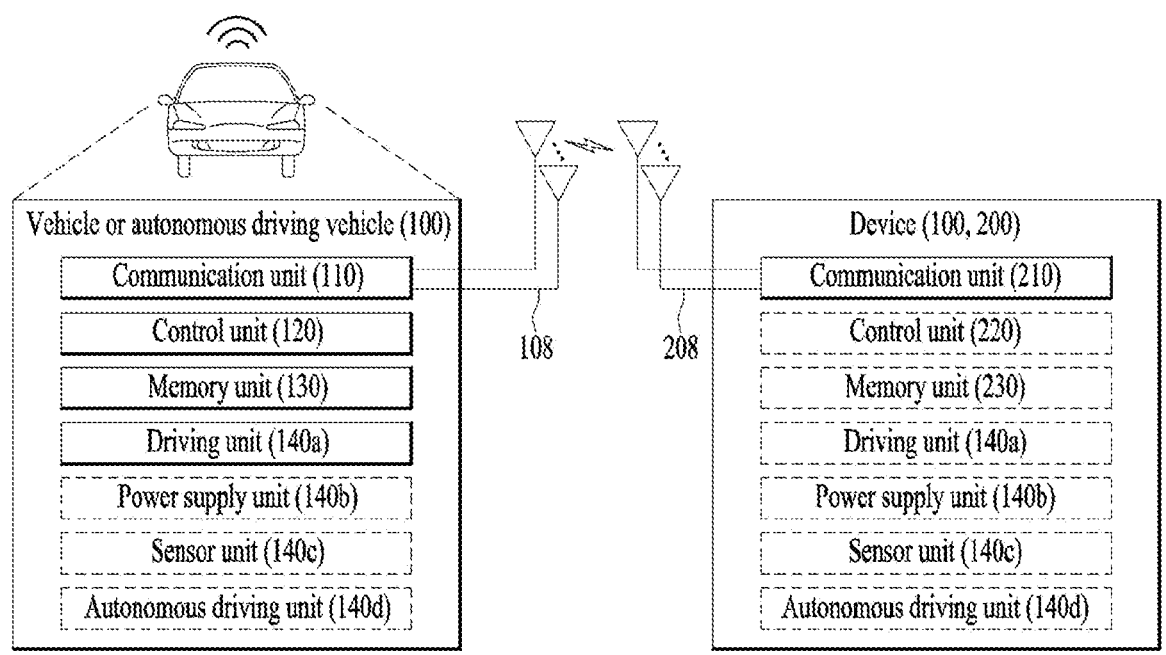

Examples of a vehicle or an autonomous driving vehicle applicable to the present disclosure FIG. 23 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a vehicle and AR/VR applicable to the present disclosure

Figure 24:
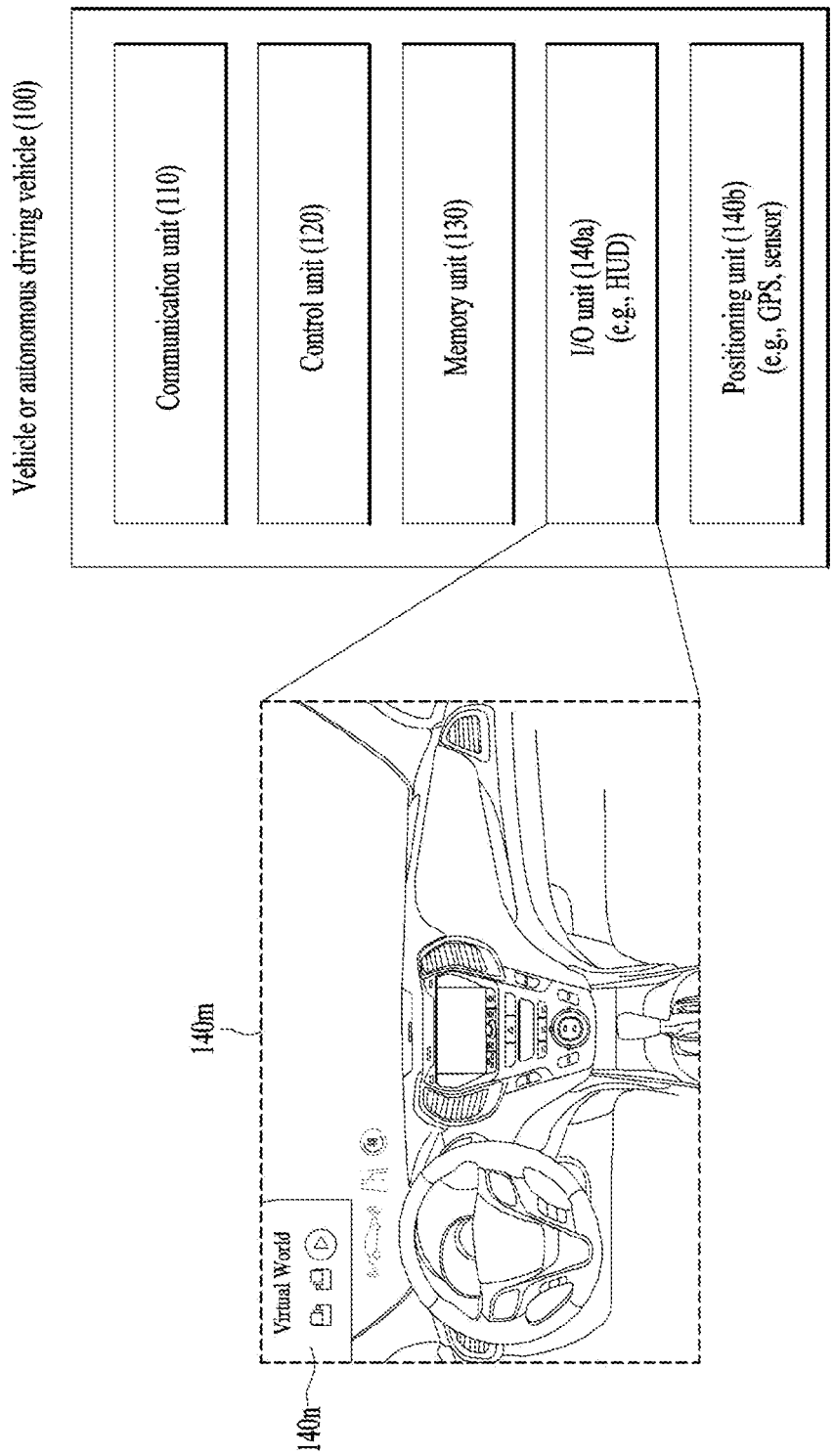

FIG. 24 illustrates a vehicle applied to the present disclosure. The vehicle may be implemented as a transport means, an aerial vehicle, a ship, etc.

Referring to FIG. 24, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR device applicable to the present disclosure

Figure 25:
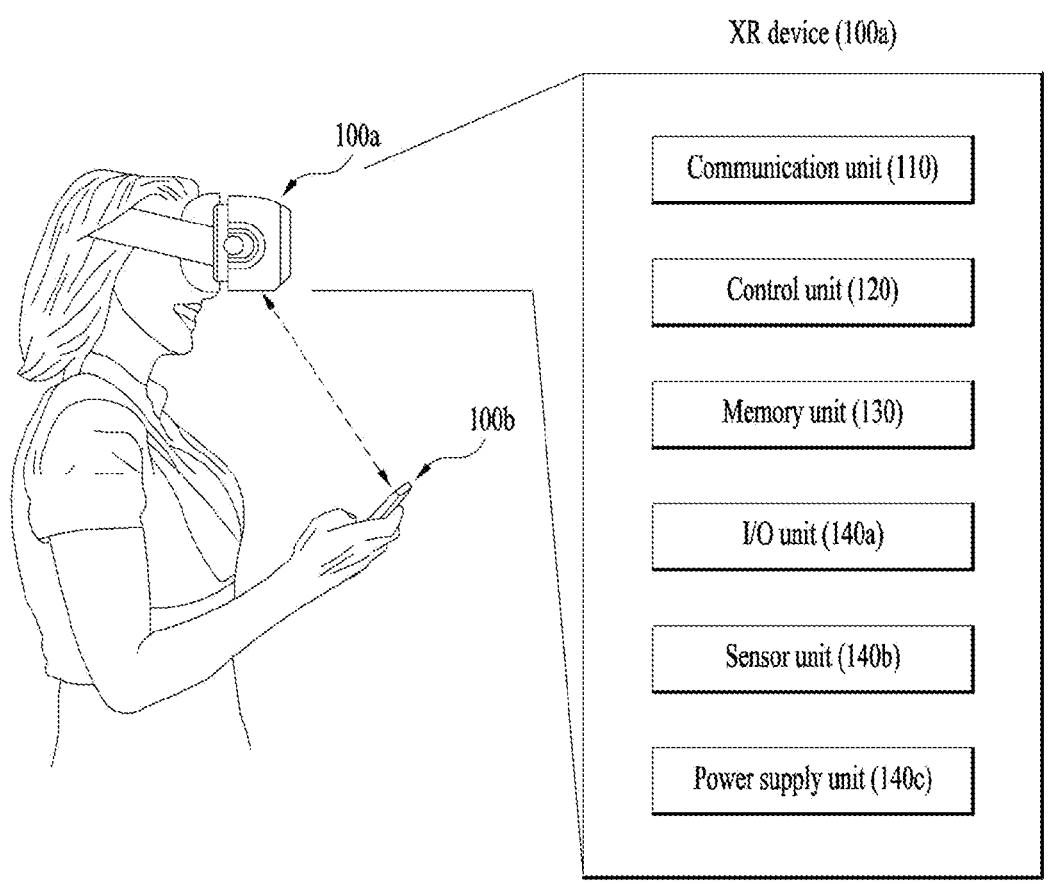

FIG. 25 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 25, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a robot applicable to the present disclosure

Figure 26:
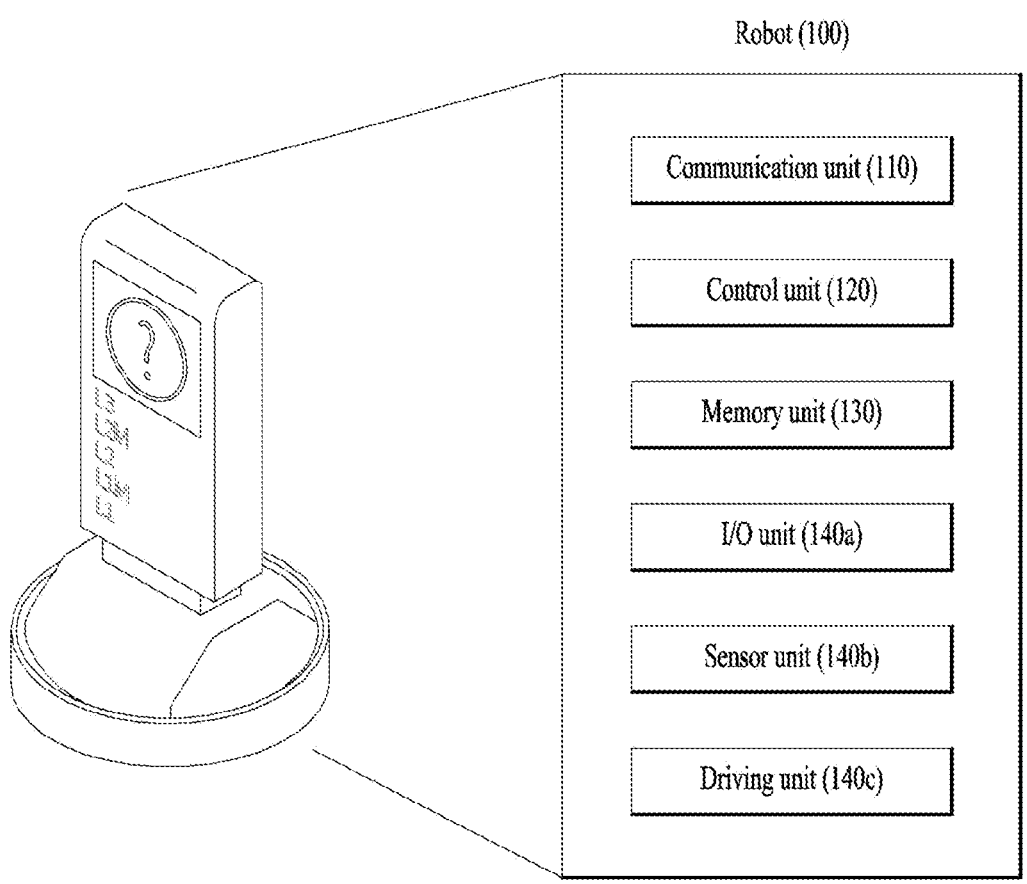

FIG. 26 illustrates a robot applied to the present disclosure. The robot may be categorized into an industrial robot, a medical robot, a household robot, a military robot, etc., according to a used purpose or field.

Referring to FIG. 26, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 22, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI device to which the present disclosure is applied.

Figure 27:
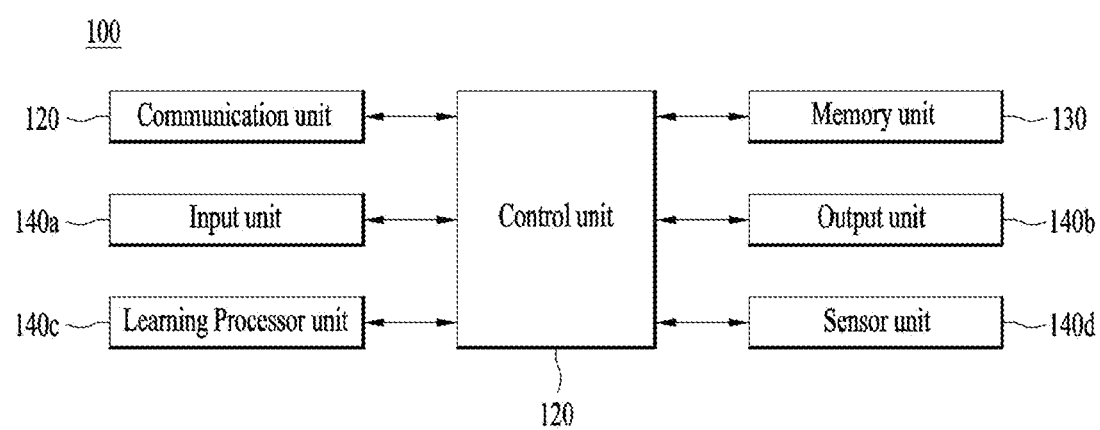

FIG. 27 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 27, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 22, respectively.

The communication unit 110 may transmit and receive wired/radio signals (e.g., sensor information, user input, learning models, or control signals) to and from external devices such as other AI devices (e.g., 100*x*, 200, or 400 of FIG. 21) or an AI server (e.g., 400 of FIG. 21) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 21). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 21). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL AVAILABILITY

The above-described embodiments of the present disclosure are applicable to various mobile communication systems.

The invention claimed is:

1. A sidelink related operation method of a transmission user equipment (UE) in a wireless communication system, the method comprising:
   determining, by the UE, a Long DRX cycle;
   determining, by the UE, an on duration based on the Long DRX cycle and a first offset;
   waking up, by the UE, at the on duration; and
   receiving, by the UE from another UE, control information,
   wherein the on duration is also based on a short DRX cycle,
   wherein:
   the first offset is determined as a sum of k times (k being an integer) a value related to a sidelink service and a second offset related to the sidelink service; and
   the Long DRX cycle and the Short DRX cycle are determined as m times and n times (m and n being an integer) the value related to the sidelink service, respectively.

2. The method of claim 1, wherein the value related to the sidelink service and the second offset are differently configured for respective sidelink services.

3. The method of claim 1, wherein the value related to the sidelink service and the second offset are configured to the same value irrespective of the sidelink service.

4. The method of claim 3, wherein a range of values to be selected as m and n is configured for each sidelink service.

5. The method of claim 4, wherein ranges of the values to be selected as m and n at least partially overlap each other.

6. The method of claim 1, wherein the value related to the sidelink service is determined based on a minimum delay related to a specific service.

7. The method of claim 1, wherein the related to the sidelink service is determined in a MAC layer based on a service ID.

8. The method of claim 1, wherein the related to the sidelink service is received via RRC signaling.

9. The method of claim 1, wherein the same value is used irrespective of the sidelink service for only the second offset among the value related to the sidelink service and the second offset.

10. The method of claim 1, wherein the UE communicates with at least one of another UE, a UE related to autonomous driving vehicle, a base station (BS), or a network.

11. A user equipment (UE) in a wireless communication system, the UE comprising:
   at least one processor; and
   at least one computer memory operatively connected to the at least one processor and configured to store commands that when executed causes the at least one processor to perform operations,
   wherein the operations includes:
   determining a Long DRX cycle;
   determining an on duration based on the Long DRX cycle and the first offset;
   waking up at the on duration; and
   receiving control information from another UE,
   wherein the first offset is determined as a sum of k times (k being an integer) a value related to a sidelink service and a second offset related to the sidelink service; and
   wherein the Long DRX cycle and the Short DRX cycle are determined as m times and n times (m and n being an integer) the value related to the sidelink service, respectively.

12. A processor for performing operations for a user equipment (UE) in a wireless communication system, the operations comprising:
- determining a Long DRX cycle;
- determining an on duration based on the Long DRX cycle and the first offset,
- waking up at the on duration; and
- receiving control information from another UE,
- wherein:
  - the first offset is determined as a sum of k times (k being an integer) a value related to a sidelink service and a second offset related to the sidelink service; and
  - the Long DRX cycle and the Short DRX cycle are determined as m times and n times (m and n being an integer) the value related to the sidelink service, respectively.

13. A non-volatile computer-readable storage medium for storing at least one computer program including at least one command for causing at least one processor to perform operations for a user equipment (UE) when being executed by the at least one processor, the operations comprising:
- determining a Long DRX cycle;
- determining an on duration based on the Long DRX cycle and the first offset;
- waking up at the on duration; and
- receiving control information from another UE,
- wherein:
  - the first offset is determined as a sum of k times (k being an integer) a value related to a sidelink service and a second offset related to the sidelink service; and
  - the Long DRX cycle and the Short DRX cycle are determined as m times and n times (m and n being an integer) the value related to the sidelink service, respectively.

* * * * *